US011122477B2

(12) United States Patent
Zhu et al.

(10) Patent No.: US 11,122,477 B2
(45) Date of Patent: Sep. 14, 2021

(54) USER PLANE FUNCTION (UPF) DUPLICATION BASED MAKE BEFORE BREAK HANDOVER

(71) Applicant: QUALCOMM Incorporated, San Diego, CA (US)

(72) Inventors: Xipeng Zhu, San Diego, CA (US); Luis Fernando Brisson Lopes, Swindon (GB); Gavin Bernard Horn, La Jolla, CA (US); Karthika Paladugu, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 13 days.

(21) Appl. No.: 16/284,701

(22) Filed: Feb. 25, 2019

(65) Prior Publication Data
US 2019/0268815 A1 Aug. 29, 2019

Related U.S. Application Data

(60) Provisional application No. 62/635,358, filed on Feb. 26, 2018.

(51) Int. Cl.
*H04W 36/02* (2009.01)
*H04W 76/00* (2018.01)
(Continued)

(52) U.S. Cl.
CPC .......... *H04W 36/026* (2013.01); *H04L 47/34* (2013.01); *H04W 36/0016* (2013.01);
(Continued)

(58) Field of Classification Search
None
See application file for complete search history.

(56) References Cited

U.S. PATENT DOCUMENTS

2009/0141684 A1* 6/2009 Hashimoto .......... H04W 36/02
370/331
2014/0254551 A1 9/2014 Chaponniere et al.
(Continued)

FOREIGN PATENT DOCUMENTS

WO 2016140757 A1 9/2016

OTHER PUBLICATIONS

"3rd Generation Partnership Project; Technical Specification Group Radio Access Network; NR; NR and NG-RAN Overall Description; Stage 2 (Release 15)", 3GPP Standard; Technical Specification; 3GPP TS 38.300, 3rd Generation Partnership Project (3GPP), Mobile Competence Centre; 650, Route Des Lucioles; F-06921 Sophia-Antipolis Cedex; France, vol. RAN WG2, No. V15.0.0, Jan. 4, 2018, pp. 1-68, XP051392360, paragraph 9.2.3, Figure 9.2.3.1-1, Figure 9.2.3 .. 2.1-1, paragraph 16.1.1, paragraph 16.1.3.
(Continued)

*Primary Examiner* — Scott M Sciacca
(74) *Attorney, Agent, or Firm* — Michael J. DeHaemer, Jr.

(57) ABSTRACT

Methods for performing a handover in wireless communications for a user plane function (UPF) are disclosed. In an aspect, the method includes establishing a tunnel between the UPF and a target base station based on information in a path switch preparation request for a make before break handover of a user equipment (UE) from a source base station to the target base station, the path switch preparation request being received in response to a request originating by the target base station. The method further includes bi-casting a downlink data packet unit (PDU) to a source base station and to the target base station with a same sequence number (SN) in a tunnel protocol, receiving PDUs from the source base station and the target base station with corresponding PDUs having the same SNs in the tunnel
(Continued)

protocol and discarding received duplicate PDUs based on the SNs in the tunnel protocol.

10 Claims, 16 Drawing Sheets

(51) Int. Cl.
*H04L 12/953* (2013.01)
*H04W 36/00* (2009.01)
*H04L 12/801* (2013.01)
*H04W 76/12* (2018.01)
*H04W 80/08* (2009.01)

(52) U.S. Cl.
CPC ... *H04W 36/0033* (2013.01); *H04W 36/0066* (2013.01); *H04W 36/0077* (2013.01); *H04W 36/023* (2013.01); *H04W 76/12* (2018.02); *H04W 80/08* (2013.01)

(56) References Cited

U.S. PATENT DOCUMENTS

| | | | | |
|---|---|---|---|---|
| 2015/0207641 | A1* | 7/2015 | Rydnell | H04W 8/02 370/312 |
| 2015/0282035 | A1* | 10/2015 | Xia | H04W 36/30 455/436 |
| 2018/0220344 | A1* | 8/2018 | Shaheen | H04W 4/60 |
| 2020/0015116 | A1* | 1/2020 | Huang | H04W 36/00 |
| 2020/0022046 | A1* | 1/2020 | Wang | H04W 12/0017 |
| 2020/0112879 | A1* | 4/2020 | Shimoda | H04L 1/16 |
| 2020/0120549 | A1* | 4/2020 | Sun | H04W 36/0066 |
| 2020/0162211 | A1* | 5/2020 | Wang | H04L 5/0032 |

OTHER PUBLICATIONS

Huawei et al., "Robust Data Transmission during Handover using Packet Duplication", 3GPP Draft; R2 -1706710 Robust Data Transmission during Handover using Packet Duplication, 3rd Generation Partnership Project (3GPP), Mobile Competence Centre; 650, Route Des Lucioles; F-06921 Sophia-Antipolis Cedex; France, vol. RAN WG2, No. Qingdao, China; Jun. 27, 2017-Jun. 29, 2017 Jun. 26, 2017, XP051301210, 5 pages, Retrieved from the Internet: URL:http://www.3gpp.org/ftp/Meetings_3GPP_SYNC/RAN2/Docs/ [retrieved on Jun. 26, 2017].
International Search Report and Written Opinion—PCT/US2019/019584—ISA/EPO—dated Aug. 1, 2019.
Nokia et al., "Dual Connected Intra-Frequency Handover for 0 ms Interruption and Mobility Robustness", 3GPP Draft; R2 -1803345 Dual Connected Intra-Frequency Handover for 0 ms Interruption and Mobility Robustness, 3rd Generation Partnership Project (3GPP), Mobile Competence Centre; 650, Route Des Lucioles; F-06921 Sophia-Antipolis Cedex; France, vol. RAN WG2, No. Athens, Greece; Feb. 26, 2018-Mar. 2, 2018 Feb. 16, 2018, XP051400477, Retrieved from the Internet: URL:http://www.3gpp.org/ftp/tsg%5Fran/WG2%5FRL2/TSGR2%5F101/.
Qualcomm Incorporated: "NR 0ms Interruption HO", 3GPP Draft ; R2-1803662_0MS_INTERRUPTION_HO, 3rd Generation Partnership Project (3GPP), Mobile Competence Centre; 650, Route Des Lucioles; F-06921 Sophia-Antipolis Cedex; France, vol. RAN WG2, No. Athens, Greece; Feb. 26, 2018-Mar. 2, 2018 Feb. 16, 2018, XP051400685, 8 pages, Retrieved from the Internet: URL:http://www.3gpp.org/ftp/tsg%5Fran/WG2%5FRL2/TSGR2%5F101/Docs/ [retrieved on Feb. 16, 2018].

* cited by examiner

900

Receiving, from a target base station, a request for downlink bi-casting of duplicative packet data units (PDUs), the request being a path switch preparation request for a make before break handover for a user equipment (UE) from a source base station, the path switch preparation request is based on a sequence (SN) status transfer message and contains target base station information — 910

Configuring a user plane function (UPF) to establish a tunnel between the UPF and the target base station — 920

Transmitting, to the target base station, UPF information to establish the tunnel between the target base station and the UPF using the target base station information and the UPF information — 930

FIG. 9

USER PLANE FUNCTION (UPF) DUPLICATION BASED MAKE BEFORE BREAK HANDOVER

CLAIM OF PRIORITY UNDER 35 U.S.C. § 120

This application claims the benefit of U.S. Provisional Application Ser. No. 62/635,358, entitled "USER PLANE FUNCTION (UPF) DUPLICATION BASED MAKE BEFORE BREAK HANDOVER" and filed on Feb. 26, 2018, which is expressly incorporated by reference in its entirety.

BACKGROUND

Aspects of the present disclosure relate generally to wireless communication networks, and more particularly, to transmitting duplicate data packet units in make before break handovers.

Wireless communication networks are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, orthogonal frequency-division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. For example, a fifth generation (5G) wireless communications technology (which can be referred to as new radio (NR)) is envisaged to expand and support diverse usage scenarios and applications with respect to current mobile network generations. In an aspect, 5G communications technology can include: enhanced mobile broadband addressing human-centric use cases for access to multimedia content, services and data; ultra-reliable-low latency communications (URLLC) with certain specifications for latency and reliability; and massive machine type communications, which can allow a very large number of connected devices and transmission of a relatively low volume of non-delay-sensitive information. As the demand for mobile broadband access continues to increase, however, further improvements in NR communications technology and beyond may be desired.

For example, for NR communications technology and beyond, current handover solutions may not provide a desired level of speed or customization for efficient operation. Thus, improvements in wireless communication operations may be desired.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

Methods, apparatuses, and computer-readable mediums for a handover in wireless communications for a user plane function (UPF) are disclosed by the present disclosure. In an aspect, the present disclosure includes a method of handover in wireless communications including establishing a tunnel between the UPF and a target base station based on information in a path switch preparation request for a make before break handover of a user equipment (UE) from a source base station to the target base station, the path switch preparation request being received in response to a request originating by the target base station. The method further includes bi-casting a downlink data packet unit (PDU) to a source base station and to the target base station with a same sequence number (SN) in a tunnel protocol, receiving PDUs from the source base station and the target base station with corresponding PDUs having the same SNs in the tunnel protocol and discarding received duplicate PDUs based on the SNs in the tunnel protocol.

In another aspect, the disclosure includes a UPF for a handover in wireless communications. The UPF may include a memory and a processor communicatively coupled with the memory. The processor may be configured to establish a tunnel between the UPF and a target base station based on information in a path switch preparation request for a make before break handover of a UE from a source base station to the target base station, the path switch preparation request being received in response to a request originating by the target base station. The processor is further configured to bi-cast a downlink PDU to a source base station and to the target base station with a same SN in a tunnel protocol, receive PDUs from the source base station and the target base station with corresponding PDUs having the same SNs in the tunnel protocol and discard received duplicate PDUs based on the SNs in the tunnel protocol.

In another aspect, the disclosure includes a UPF for handover in wireless communications. The UPF may include means for establishing a tunnel between the UPF and a target base station based on information in a path switch preparation request for a make before break handover of a UE from a source base station to the target base station, the path switch preparation request being received in response to a request originating by the target base station. The UPF further includes means for bi-casting a downlink PDU to a source base station and to the target base station with a same SN in a tunnel protocol, means for receiving PDUs from the source base station and the target base station with corresponding PDUs having the same SNs in the tunnel protocol and means for discarding received duplicate PDUs based on the SNs in the tunnel protocol.

In another aspect, the disclosure includes a non-transitory computer-readable medium storing computer code executable by a processor of the UPF for handover in wireless communications. The non-transitory computer-readable medium may include one or more codes executable to establish a tunnel between the UPF and a target base station based on information in a path switch preparation request for a make before break handover of a UE from a source base station to the target base station, the path switch preparation request being received in response to a request originating by the target base station. The non-transitory computer-readable medium may further include one or more codes executable to bi-cast a downlink PDU to a source base station and to the target base station with a same SN in a tunnel protocol, receive PDUs from the source base station and the target base station with corresponding PDUs having the same SNs in the tunnel protocol and discard received duplicate PDUs based on the SNs in the tunnel protocol.

In another aspect, the disclosure includes a method for a UE to be involved in a handover in wireless communication, the method including transmitting, via a first radio or a second radio of the UE, a connection reconfiguration complete message to a target base station for completing a make before break handover of a UE from a source base station to a target base station. The method further includes for uplink transmissions, transmitting, via the first radio, a first PDU to the source base station and transmitting, via the second radio, a second PDU to the target base station, wherein the first PDU and the second PDU have a same SN. The method further includes for downlink transmissions, receiving, via the first radio, one or more PDUs from the source base station, each received PDU having at least one corresponding SN, receiving, via the second radio, one or more PDUs from the target base station, each received PDU having at least one corresponding SN, deciphering the received one or more PDUs from the source base station and the target base station respectively and storing the received one or more PDUs in a buffer, discarding duplicative PDUs in the buffer based on the at least one corresponding SN for each received PDU and re-ordering remaining PDUs based on the at least one corresponding SNs.

In another aspect, the disclosure includes a UE involved in a handover in wireless communications. The UE may include a memory and a processor communicatively coupled with the memory. The processor may be configured to transmit, via a first radio or a second radio of the UE, a connection reconfiguration complete message to a target base station for completing a make before break handover of the UE from a source base station to a target base station. The processor is further configured, for uplink transmissions, to transmit, via the first radio, a first PDU to the source base station and to transmit, via the second radio, a second PDU to the target base station, wherein the first PDU and the second PDU have a same SN. The processor is further configured for downlink transmissions, to receive, via the first radio, one or more PDUs from the source base station, each received PDU having at least one corresponding SN, receive, via the second radio, one or more PDUs from the target base station, each received PDU having at least one corresponding SN, decipher the received one or more PDUs from the source base station and the target base station respectively and store the received one or more PDUs in a buffer, discard duplicative PDUs in the buffer based on the at least one corresponding SN for each received PDU and re-order remaining PDUs based on the at least one corresponding SNs.

In another aspect, the disclosure includes UE involved in a handover in wireless communications. The UE may include means for transmitting, via a first radio or a second radio of the UE, a connection reconfiguration complete message to a target base station for completing a make before break handover of the UE from a source base station to a target base station. The UE further includes for uplink transmissions, means for transmitting, via the first radio, a first PDU to the source base station and means for transmitting, via the second radio, a second PDU to the target base station, wherein the first PDU and the second PDU have a same SN. The UE further includes for downlink transmissions, means for receiving, via the first radio, one or more PDUs from the source base station, each received PDU having at least one corresponding SN, means for receiving, via the second radio, one or more PDUs from the target base station, each received PDU having at least one corresponding SN, means for deciphering the received one or more PDUs from the source base station and the target base station respectively and storing the received one or more PDUs in a buffer, means for discarding duplicative PDUs in the buffer based on the at least one corresponding SN for each received PDU and means for re-ordering remaining PDUs based on the at least one corresponding SNs.

In another aspect, the disclosure includes a non-transitory computer-readable medium storing computer code executable by a processor of the UE involved in a handover in wireless communications. The non-transitory computer-readable medium may include one or more codes executable to transmit, via a first radio or a second radio of the UE, a connection reconfiguration complete message to a target base station for completing a make before break handover of the UE from a source base station to a target base station. The non-transitory computer-readable medium may further include one or more codes executable, for uplink transmissions, to transmit, via the first radio, a first PDU to the source base station and to transmit, via the second radio, a second PDU to the target base station, wherein the first PDU and the second PDU have a same SN. The non-transitory computer-readable medium may further include one or more codes executable, for downlink transmissions, to receive, via the first radio, one or more PDUs from the source base station, each received PDU having at least one corresponding SN, receive, via the second radio, one or more PDUs from the target base station, each received PDU having at least one corresponding SN, decipher the received one or more PDUs from the source base station and the target base station respectively and store the received one or more PDUs in a buffer, discard duplicative PDUs in the buffer based on the at least one corresponding SN for each received PDU and re-order remaining PDUs based on the at least one corresponding SNs.

In another aspect, the disclosure includes a method for an access and mobility function/session management function (AMF/SMF) entity to be involved in a handover in wireless communication, the method including receiving, from a target base station, a request for downlink bi-casting of duplicative PDUs, the request being a path switch preparation request for a make before break handover for a UE from a source base station to the target base station, the path switch preparation request is based on a sequence number (SN) status transfer message and contains target base station information. The method further includes configuring a user plane function (UPF) to establish a tunnel between the UPF and the target base station and transmitting, to the target base station, UPF information to establish the tunnel between the target base station and the UPF using the target base station information and the UPF information.

In another aspect, the disclosure includes an AMF/SMF entity to be involved in a handover in wireless communication. The AMF/SMF entity may include a memory and a processor communicatively coupled with the memory. The processor may be configured to receive, from a target base station, a request for downlink bi-casting of duplicative PDUs, the request being a path switch preparation request for a make before break handover for a UE from a source base station to the target base station, the path switch preparation request is based on a SN status transfer message and contains target base station information. The processor may further be configured to configure a UPF to establish a tunnel between the UPF and the target base station and to transmit, to the target base station, UPF information to establish the tunnel between the target base station and the UPF using the target base station information and the UPF information.

In another aspect, the disclosure includes an AMF/SMF involved in a handover in wireless communications. The AMF/SMF entity may include means for receiving, from a target base station, a request for downlink bi-casting of duplicative PDUs, the request being a path switch preparation request for a make before break handover for a user equipment (UE) from a source base station to the target base station, the path switch preparation request is based on a SN status transfer message and contains target base station information. The AMF/IMF entity further includes means for configuring a UPF to establish a tunnel between the UPF and the target base station and means for transmitting, to the target base station, UPF information to establish the tunnel between the target base station and the UPF using the target base station information and the UPF information.

In another aspect, the disclosure includes a non-transitory computer-readable medium storing computer code executable by a processor of an AMF/IMF entity involved in a handover in wireless communications. The non-transitory computer-readable medium may include one or more codes executable to receive, from a target base station, a request for downlink bi-casting of duplicative PDUs, the request being a path switch preparation request for a make before break handover for a UE from a source base station to the target base station, the path switch preparation request is based on a SN status transfer message and contains target base station information. The non-transitory computer-readable medium may further include one or more codes executable to configure a UPF to establish a tunnel between the UPF and the target base station and code to transmit, to the target base station, UPF information to establish the tunnel between the target base station and the UPF using the target base station information and the UPF information.

In another aspect, the disclosure include a target base station involved in a handover in wireless communication. The method includes receiving, from a source base station, a SN transfer message and transmitting, to an AMF/SMF entity, a path switch preparation request for a make before break handover for a UE from the source base station to the target base station, the path switch preparation request including target base station tunnel information and configured to trigger a user plane function (UPF) to transmit PDUs for the UE to both the target base station and the source base station during the handover. The method further includes receiving, from the AMF/SMF entity, a path switch preparation response including UPF tunnel information and establishing a tunnel between the target base station and the UPF using the UPF tunnel information.

In another aspect, the disclosure includes a target base station involved in a handover in wireless communication. The target base station may include a memory and a processor communicatively coupled with the memory. The processor may be configured to receive, from a source base station, a SN transfer message and to transmit, to an AMF/SMF entity, a path switch preparation request for a make before break handover for a UE from the source base station to the target base station, the path switch preparation request including target base station tunnel information and configured to trigger a UPF to transmit PDUs for the UE to both the target base station and the source base station during the handover. The processor may be further configured to receive, from the AMF/SMF entity, a path switch preparation response including UPF tunnel information and to establish a tunnel between the target base station and the UPF using the UPF tunnel information.

In another aspect, the disclosure includes a target base station involved in a handover in wireless communications. The target base station may include means for receiving, from a source base station, a SN transfer message and means for transmitting, to an AMF/SMF entity, a path switch preparation request for a make before break handover for a UE from the source base station to the target base station, the path switch preparation request including target base station tunnel information and configured to trigger a UPF to transmit PDUs for the UE to both the target base station and the source base station during the handover. The target base station may further include means for receiving, from the AMF/SMF entity, a path switch preparation response including UPF tunnel information and means for establishing a tunnel between the target base station and the UPF using the UPF tunnel information.

In another aspect, the disclosure includes a non-transitory computer-readable medium storing computer code executable by a processor of target base station involved in a handover in wireless communications. The non-transitory computer-readable medium may include one or more codes executable to receive, from a source base station, a SN transfer message and to transmit, to an AMF/SMF entity, a path switch preparation request for a make before break handover for a UE from the source base station to the target base station, the path switch preparation request including target base station tunnel information and configured to trigger a UPF to transmit PDUs for the UE to both the target base station and the source base station during the handover. The non-transitory computer-readable medium may further include one or more codes executable to receive, from the AMF/SMF entity, a path switch preparation response including UPF tunnel information and to establish a tunnel between the target base station and the UPF using the UPF tunnel information.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which:

FIG. 9 is a flow diagram of an example of a method of operating a AMF//SMF to perform a handover of a UE from a source base station to a target base station;

DETAILED DESCRIPTION

Figure 1:
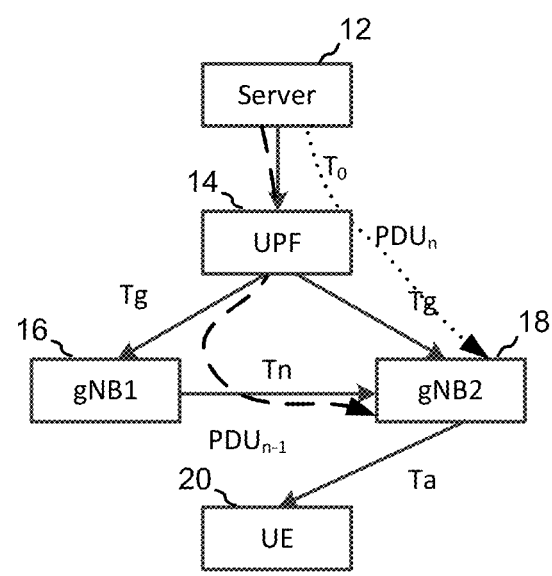
FIG. 1 is a schematic diagram of an example of a wireless communication network showing delays which can lead to a head-of-line blocking (HOL) issue.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

The present disclosure generally relates to techniques for a handover of a UE from a source base station to a target base station and using bi-casting of PDUs to assist or prevent HOL blocking issues as discussed below. The bi-casting of the PDUs may be applied to downlink data and uplink data. For example, for downlink data, a UPF may bi-cast PDUs to both the source base station and the target base station with corresponding PDUs having the same SN, e.g., the same GTP-U SN. The source base station and the target base station may generate the same SN for the payload of the received PDUs and may forward the PDUs having the same PDCP SN. The source base station may send one or more PDUs having either a GTP-U-SN or a PDCP SN to the target base station. For uplink data, the UE may bi-cast PDUs having the same SNs, e.g., PDCP SNs, to both the source base station and to the target base station. The source base station and the target base station may generate the same SN for the payload of the received PDUs and may forward the PDUs having the same GTP-U SNs to the UPF. The source base station may send one or more PDUs having either a GTP-U-SN or a PDCP SN to the target base station. The UE, UPF and the target base station may include duplication components to discard duplicative PDUs having the same SNs.

Each of the aspects described above are performed or implemented in connection with FIGS. 1-14 which are described in more detail below. In some aspects, the methods, techniques, or schemes discussed herein may be within the limits of current specifications of various wireless communication standards (e.g., 3GPP standards). In some examples, the techniques or methods discussed herein may be implemented by or reside in hardware or software at a UE, a base station or a UPF.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium, such as a computer storage media. Storage media may be any available media that may be accessed by a computer. By way of example, and not limitation, such computer-readable media may comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that may be used to store computer executable code in the form of instructions or data structures that may be accessed by a computer.

It should be noted that the techniques described herein may be used for various wireless communication networks such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1X, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over a shared radio frequency spectrum band. The description below, however, describes an LTE/LTE-A and/or 5G New Radio (NR) system for purposes of example, and LTE or 5G NR terminology is used in much of the description below, although the techniques are applicable beyond LTE/LTE-A and 5G NR applications, e.g., to other next generation communication systems).

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

Various aspects or features will be presented in terms of systems that can include a number of devices, components, modules, and the like. It is to be understood and appreciated that the various systems can include additional devices, components, modules, etc. and/or may not include all of the devices, components, modules etc. discussed in connection with the figures. A combination of these approaches can also be used.

Referring to FIG. 1, an example of a wireless communication network showing delays which can lead to a HOL blocking issue is illustrated. As shown, the wireless communication network 10 includes a server 12 that may transmit one or more PDUs to a UPF 14. The UPF 14 may transmit the one or more PDUs to a serving or source base station 16 and to a target base station 18 during a handover phase of the UE 20. URLLC service requires PDUs to be delivered with short latency and very high reliability. For example, for remote control applications, a controlled object (e.g., UE 20), such as a drone, flight or car, receives controlling commands every 1 ms with T ms latency. The UE 20 transmits status data to the server 12 each 1 ms with S ms latency. The continuous data transmission shall be supported in mobility scenarios as well. This can be referred to as 0 ms interruption handover. Make before break handover is an implementation that can achieve 0 ms interruption handovers. However, handover procedures usually has a source to target data forwarding phase before the source stops transmitting which introduces an extra delay. The extra delay can lead to HOL blocking issues.

For example, during handover, a $PDU_n$ is delivered to the target base station 18 with a delay of $T_O+T_g$, where $T_O$ is the delay between the server 12 and the UPF 14 and $T_g$ is the delay between the UPF 14 and the target base station 18. The previous PDU, $PDU_{n-1}$, is forwarded by the source base station 16 to the target base station 18 with a delay of $T_O+T_g+T_n$, with $T_n$ being the delay between the source base station 16 and the target base station 18. Due to re-ordering of the PDUs at the target base station 18, $PDU_n$ cannot be delivered to high layer (e.g., IP layer) of the UE 20 before $PDU_{n-1}$ is delivered. This scenario is referred to as HOL blocking issue and can lead to $T_n$ interruption from the high layer perspective. Mobile broad band (MBB) service is not sensitive to this interruption. However, for URLLC, this interruption may lead to user-plane interruption due to the packet data convergence protocol (PDCP) re-ordering which may cause the URLLC object, e.g., UE 20, to be out of control (e.g., interruption, packet loss or packet delay). Accordingly, due to the requirements for URLLC, new approaches or procedures may be desirable to avoid such HOL blocking issues.

Additional features of the present aspects are described in more detail below with respect to FIGS. 2-14.

Figure 2:
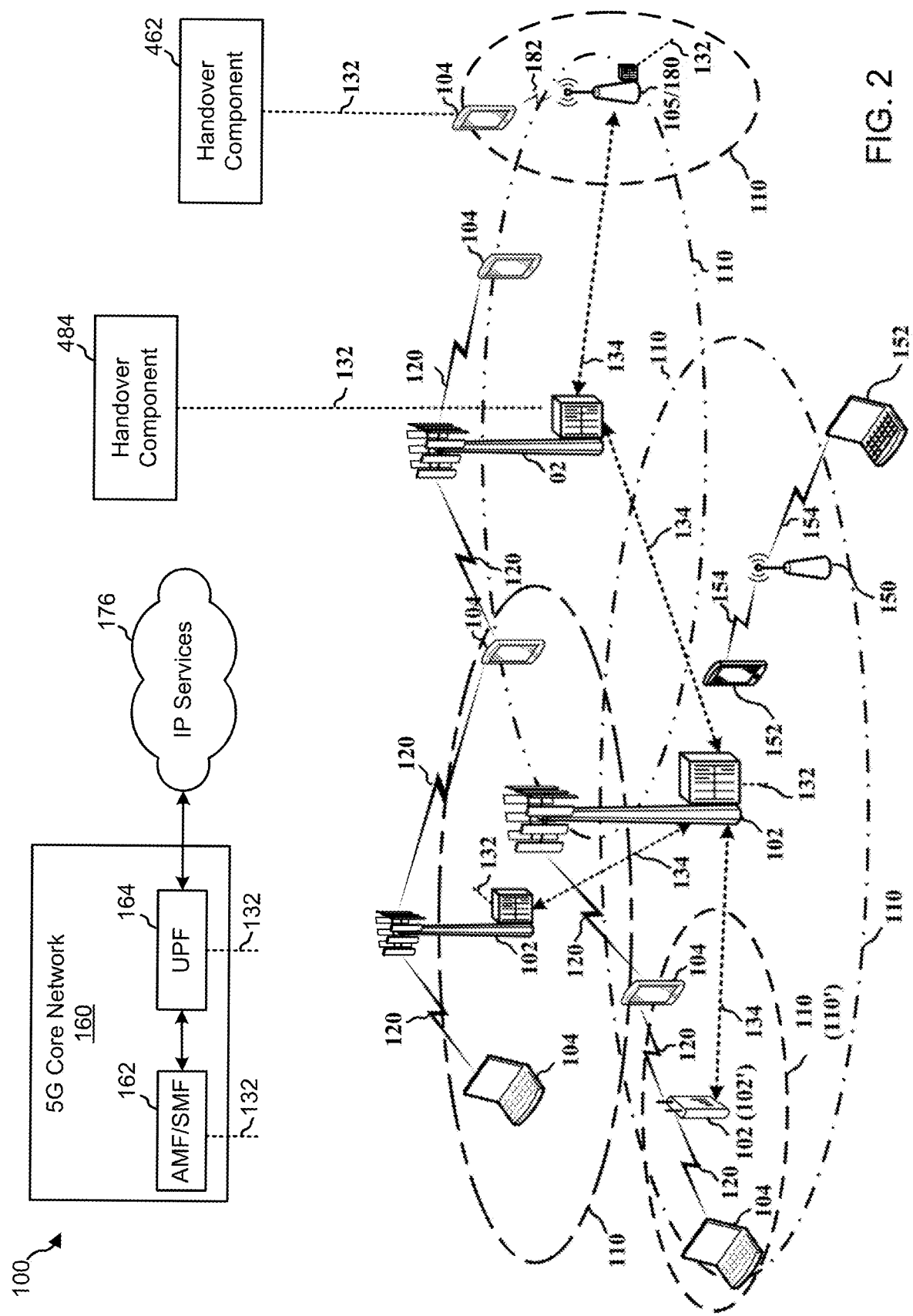
FIG. 2 is a schematic diagram of an example of a wireless communication network including at least one UE having a handover component configured according to this disclosure to transmit a duplicate packet data unit to both a source base station and a target base station.

Referring to FIG. 2, in accordance with various aspects of the present disclosure, an example wireless communication network 100 includes at least one UE 104 with a modem having a UE handover component 462 for performing a make before break handover. Further, wireless communication network 100 includes at least one base station 102 with a modem having a base station handover component 484 for performing a make before break handover. Thus, according to the present disclosure, a UE 104 can be handed off from a source base station 102 to a target base station 102 using a make before break handoff with the downlink communications and uplink communications being bi-casted.

The one or more UEs 104 and/or the one or more base stations 102 may communicate with other UEs and/or other base stations via an Evolved Packet Core (EPC) 160. The base stations 102 (collectively referred to as Evolved Universal Mobile Telecommunications System (UMTS) Terrestrial Radio Access Network (E-UTRAN)) interface with the EPC 160 through backhaul links 132 (e.g., S1 interface). The backhaul links 132 may be wired or wireless. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of $Y_x$ MHz (where x is a number of component carriers) used for transmission in each direction. The carriers may or may not be adjacent to or contiguous with each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the network.

A base station 102, whether a small cell 102' or a large cell (e.g., macro base station), may include an eNB, gNodeB (gNB), or other type of base station. Some base stations, such as a gNB 180 may operate in a traditional sub 6 GHs spectrum, in millimeter wave (mmW) frequencies, and/or near mmW frequencies in communication with the UE 104. When the gNB 180 operates in mmW or near mmW frequencies, the gNB 180 may be referred to as a mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station 180 may utilize beamforming 184 with the UE 104 to compensate for the extremely high path loss and short range.

The base station 102 may also be referred to as a gNB, Node B, evolved Node B (eNB), an access point, a base transceiver station, a radio base station, a radio transceiver, a transceiver function, a basic service set (BSS), an extended service set (ESS), or some other suitable terminology. The base station 102 provides an access point to the EPC 160 for one or more UEs 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Figure 5:
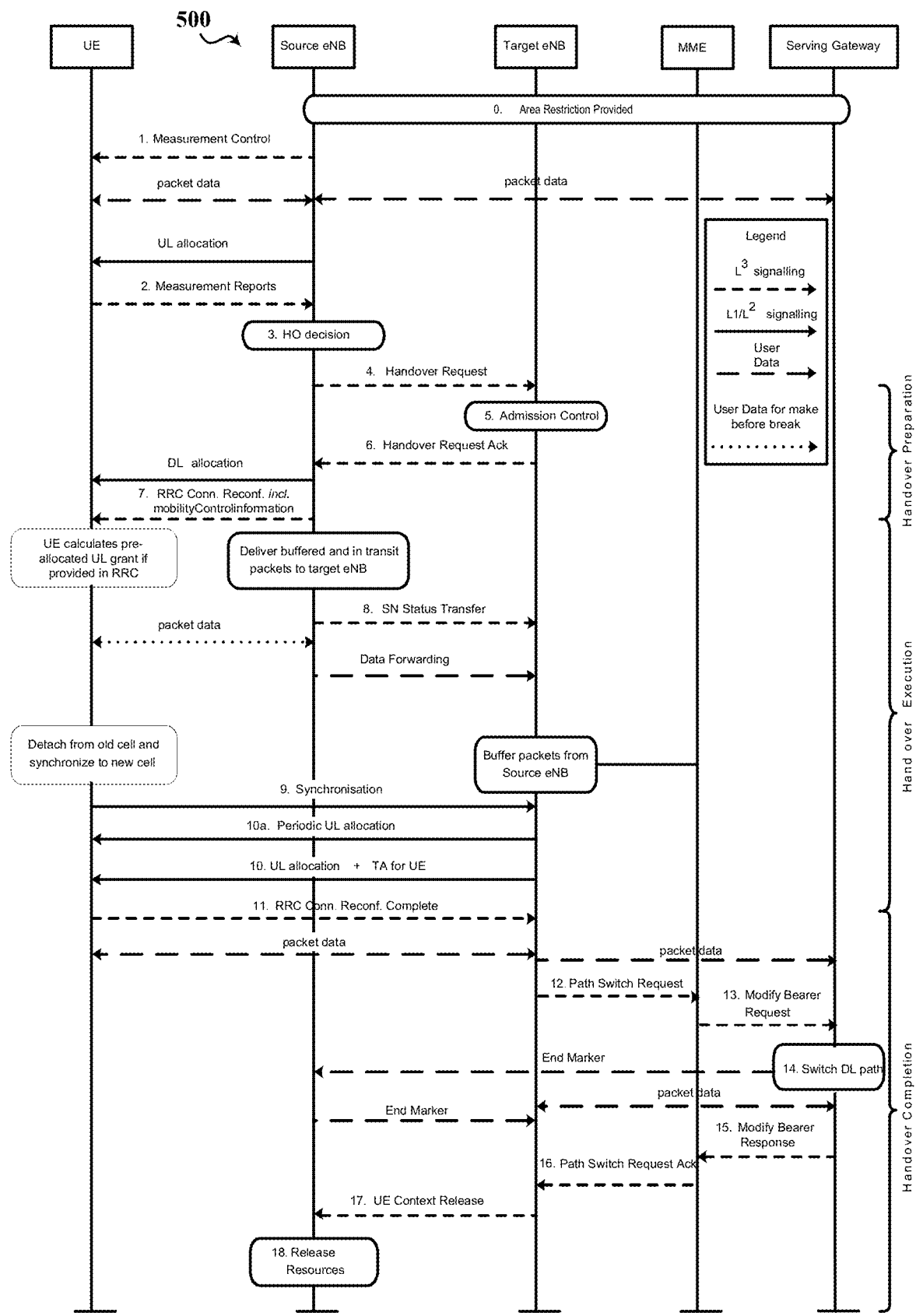
FIG. 5 is a schematic diagram illustrating an example of an LTE or 3GPP network handover of a UE from a source base station to a target base station.
Figure 6:
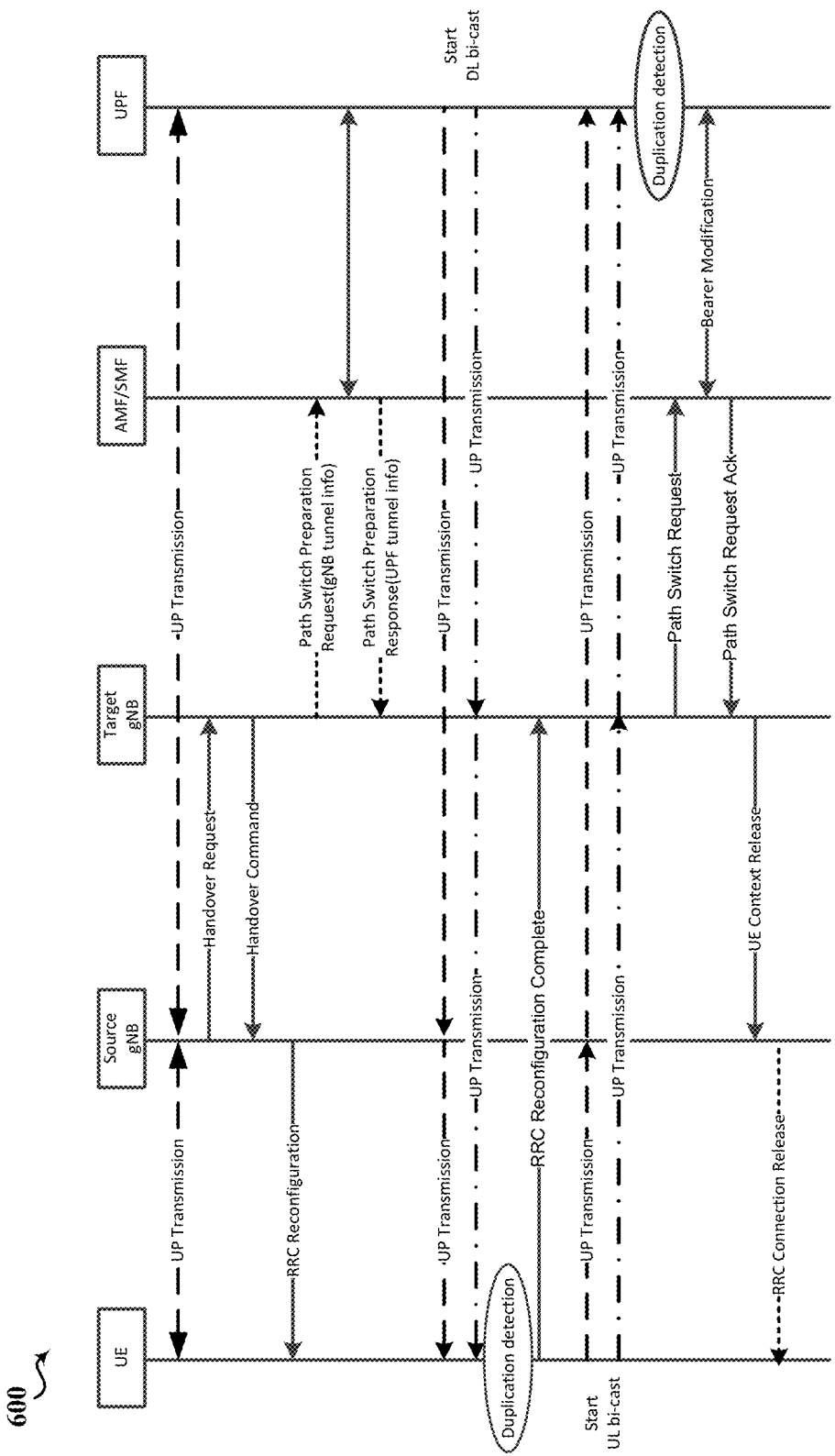
FIG. 6 is a schematic diagram illustrating an example of a make before break URLLC handover of a UE from a source base station to a target base station.

The base stations 102 and the UEs 104 are able to communicate to a network through a 5G core network 160. The core network 160 may include an Access and Mobility Management Function/Session Management Function (AMF/SMF) entity 162, User Plane Function (UPF) 164 and other entity or components for communicating data packet units (PDUs). The AMF/SMF entity of FIG. 6 may provide similar functions as the AMF/SMF entity of FIG. 5. Although FIG. 2, shows a 5G core network 160, other core networks can be used. For example, an LTE core network can be used with a Mobility Management Entity (MME) providing similar functions as the AMF/SMF entity 162 and a Serving Gateway providing similar functions as the UPF 164. FIGS. 5 and 6 show the handover procedures for an LTE based core network and a 5G based core network, respectively.

Figure 3:
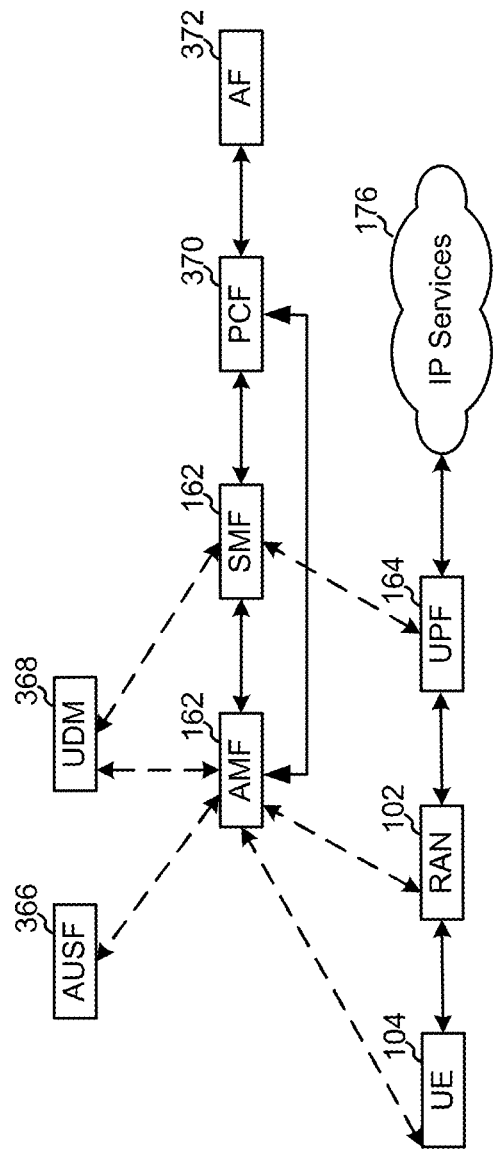
FIG. 3 is a schematic diagram of an example of a 5G core network.

Referring to FIG. 3, a schematic diagram of a 5G core network is illustrated. As shown, the core network 160 may include an Authentication Server Function (AUSF) 366, Unified Data Management (UDM) 368, AMF/SMF entity 162 (shown as two elements), Policy Control Information (PCF) 370 and Application Function (AF) 372, as well as other components for a network (e.g., IP Services 176) to communicate with a UE 104 and a random access network (RAN) (which can include one or more base stations 102). The IP Services 176 may include the Internet, an intranet, an IP Multimedia Subsystem (IMS), a PS Streaming Service, and/or other IP services.

The AMF 362 provides several functions including, but not limited to, registration management, connection management, reachability management, mobility management, access authentication, access authorization, location services management, and EPS bearer ID allocation. The SMF 362 provides several functions including, but not limited to, session management, UE IP address allocation and management, ARP proxying and/or neighbor solicitation proxying, selection and control of UP function, configures traffic steering at UPF to route traffic to proper destinations, termination of interfaces towards policy control functions, lawful intercepts, control and coordination of charging data collection at the UPF, termination of SM parts of NAS messages, downlink data notification and roaming functionality. The UPF 364 provides several functions including, but not limited to, anchor point for intra/inter-RAT mobility, external PDU session point of interconnect to data network (e.g., IP services 176), packet inspection, user plane part of policy rule information, lawful intercepts, traffic usage reporting, QoS handling for user plane, uplink traffic verification, transport level packet marking in the uplink and downlink, sending and forwarding one or more "end marker," and ARP proxying and/or neighbor soliciting proxying. The AUSF 366 handles authentication of the components within the 5G core network 160. The UDM 368 provides several functions including, but not limited to, generation of authentication credentials, user identification handling, access authorization, support for service/session continuity, subscription management and SMS management. The PCF 370 provides several functions including, but not limited to, supports unified policy framework to govern network behavior, provides policy rules to control plane functions for enforcement, and accesses subscription information relevant for policy decision in the Unified Data Repository (UDR). The AF 372 provides several functions including, but not limited to, application influence on traffic routing, accessing network exposure function and interacting with policy framework for policy control.

Figure 4:
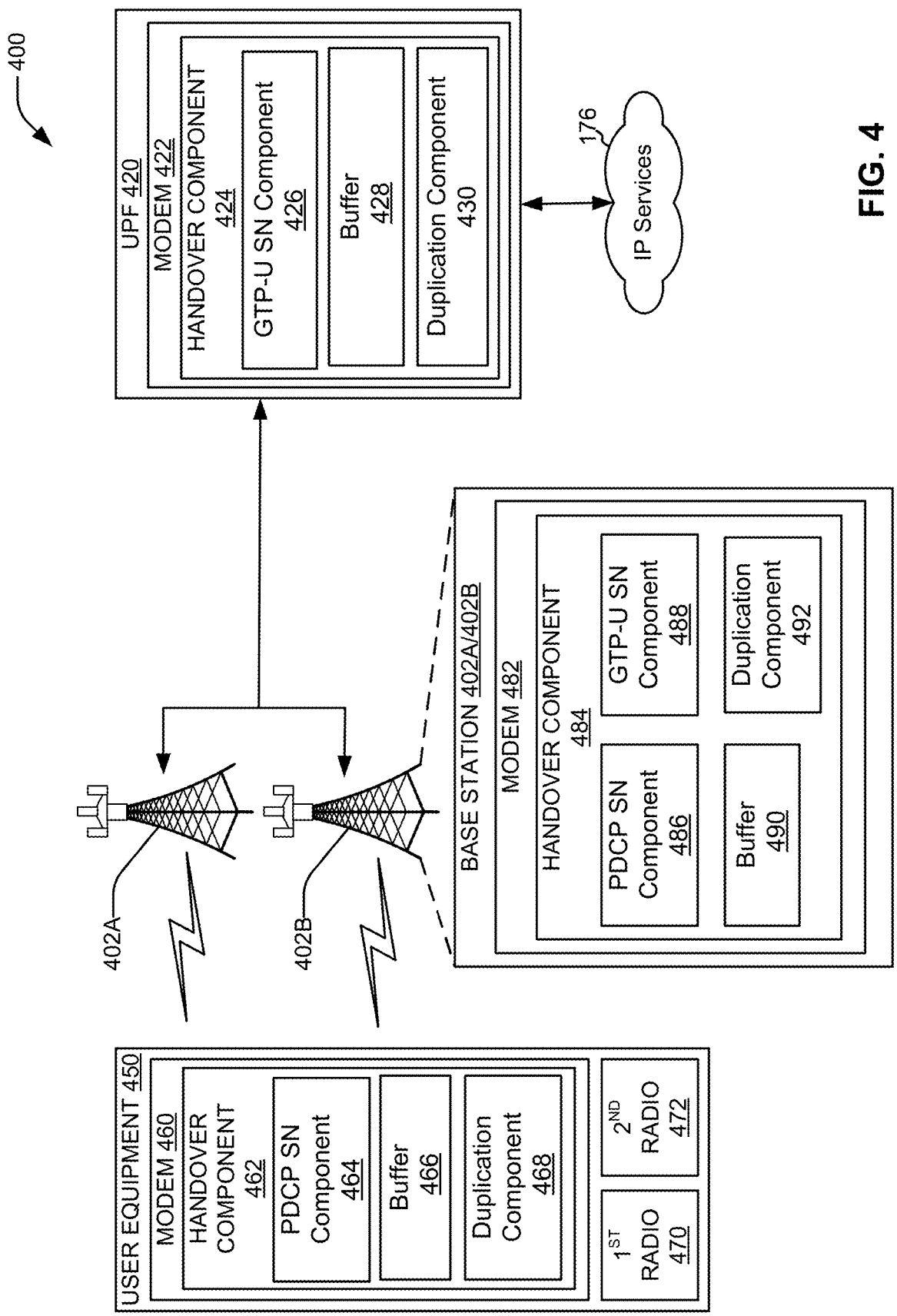
FIG. 4 is a schematic diagram illustrating an example of a UE, source base station, target base station and UPF for performing a handover of the UE.

Referring to FIG. 4, in one aspect, the wireless communication system 400 includes a user equipment (UE) 450, which may be an example of the UE 104, undergoing a make before break handover from a source base station 402A to a target base station 402B, which may be examples of the base stations 102. For instance, the UE 450 includes dual radios with a first radio 470 configured to communicate with the source base station 402A and a second radio 472 configured to communicate with the target base station 402B. In an aspect, the UE 450 may wirelessly transmit/receive one or more packet data units (PDUs) to/from both the source base station 402A and the target base station 402B. For instance, for downlink communications, the UE 450 may receive one or more PDUs from the source base station 402A using the first radio 470 and may receive one or more PDUs from the target base station 402B using the second radio 472. Similarly, for uplink communications, the UE 450 may transmit one or more PDUs to the source base station 402A using the first radio 470 and may transmit one or more PDUs to the target base station 402B using the second radio 472. In an aspect, the communications between the UE 450 and the source base station 402A and the communications between the UE 450 and the target base station 402B may use the same or different radio access technologies (RAT). Additionally, the source base station 402A and the target base station 402B may be the same type of base stations (e.g., macrocell, picocell, or femtocell) or may be different types of base stations.

The UE 450 can include a modem 460 having a handover component 462 configured to manage communication exchange signaling associated with the first radio 470 and/or the second radio 472 via one or more radio frequency (RF) communication resources. For example, the handover component 462 can receive a measurement control message from the source base station 402A via the first radio 470 and can provide measurement reports to the source base station 402A via the first radio 470. The source base station 402A can use the measurement reports to determine whether to initiate a handover procedure. For downlink communications, the handover component 462 can wirelessly receive the one or more PDUs from the source base station 402A and from the target base station 402B, decipher the received one or more PDUs and store the received one or more PDUs in a buffer 466. As explained in more detail below, a duplication component 468 may detect and discard one instance of a duplicate PDU stored in the buffer 466. For example, when the duplication component 468 detects a duplicate PDU, the duplication component 468 may discard the duplicate PDU from the source base station 402A.

In an aspect, the handover component 462 may include a Packet Data Convergence Protocol Sequence Number (PDCP SN) component 464. For uplink communications, the PDCP SN component 464 may include a PDCP SN in the header of each PDU that is transmitted to the source base station 402A and the target base station 402B. During the handover process, the PDCP SN component 464 may transmit a PDU having a header with a PDCP SN to the source base station 402A and transmit a PDU having a header with the same PDCP SN to the target base station 402B. In an aspect, the PDU transmitted to the source base station 402A may have a header having an identifier identifying the source base station 402A (e.g., a source base station identifier), the PDCP SN and a payload and the PDU transmitted to the target base station 40B may have a header having an identifier identifying the target base station 402B (e.g., a target base station identifier), the same PDCP SN and the same payload. In another aspect, the PDUs transmitted to the source base station 402A and to the target base station 402B may each have a header having an identifier identifying the source base station 402A (e.g., a source base station identifier), an identifier identifying the target base station 402B (e.g., a target base station identifier), the same PDCP SN and the same payload. As explained below, by transmitting PDUs having the same PDCP and the same payload, the target base station 402B can detect and discard an instance of duplicative PDUs, one PDU received from the UE 450 and one PDU forwarded by the source base station 402A. For clarity purposes, when the UE 450 has a PDU to transmit during a handover process, e.g., the transition process, the handover component 462 transmits the same PDU (e.g., having the same PDCP SN and payload) to both the source base station 402A and the target base station 402B. By transmitting the same PDU to both the source base station 402A and to the target base station 402B, the target base station 402B is able to prevent and/or reduce HOL blocking issues.

Each of the source base station 402A and the target base station 402B include a modem 482 having a handover component 484. The handover component 484 may include a PDCP SN component 486, a general packet radio service (GPRS) tunneling protocol (GTP) user data (GTP-U) SN component 488, buffer 490 and duplication component 492. The PDCP SN component 486 generates a PDCP SN for each downlink PDU received from the UPF. The GTP-U SN component 488 generates a GTU-U SN for each uplink PDU received by the UE 450. The buffer 490 stores received PDUs. The duplication component 492 detects and discards duplicative PDUs. For downlink data, PDUs are received from the UPF 420 with each received PDU having a GTP-U SN. As explained in further detail below, the UPF 420 sends (e.g., bi-casts) the same or similar PDUs to both the source base station 402A and target base station 402B during the handover procedure. For example, the UPF 420 sends a PDU to the source base station 402A having a header with a GTP-U SN and sends a PDU to the target base station 402B having a header with the same GTP-U SN. The PDCP SN components 486 of the source base station 402A and target base station 402B receive the PDUs having the same GTP-U SN and generate the same PDCP SN for the PDUs. Each of the source base station 402A and target base station 402B then transmits the PDUs having the same generated PDCP SN to the UE 450. For uplink data, both of the source base station 402A and the target base station 402B receive the same or similar PDUs from the UE 450, with the two PDUs having the same PDCP SN and same payload. The GTP-U SN component 488 of the source base station 402A and the target base station 402B generate a GTP-U SN for their respective PDUs. The generated GTP-U SNs are inserted into the header of the respective PDU. The source base station 402A then forwards the PDU having the GTP-U SN to the target base station 402B. The target base station 402B deciphers the PDUs from the source base station 402A and stores them in the buffer 490 along with the PDUs the target base station 402B has received from the UE 450. The duplication component 492 of the target base station 402B then detects and discards duplicative PDUs having the same GTP-U SNs. For example, the duplication component 492 detects duplicative PDUs and discards the duplicative PDUs from the source base station 402A. The handover component 484 then reorders the remaining PDUs in the buffer 490 and sends them to the UPF 420. Because the target base station 402B receives the same PDUs from both the source base station 402A and the UE 450, the target base station 402B is able to prevent and/or reduce HOL blocking issues.

The UPF 420 includes a modem 422 having a handover component 424 with a GTP-U SN component 426, buffer 428 and duplication component 430. The GTP-U SN component 426 generates a GTU-U SN for each downlink PDU to be sent to the UE 450. The buffer 428 stores received PDUs, e.g., uplink PDUs. The duplication component 430 detects and discards duplicative PDUs stored in the buffer 428. For downlink PDUs to be sent to the UE 450, the GTP-U SN component 488 generates a GTU-U SN. For each downlink PDU, the handover component 424 can generate one or more headers for the PDU. In one aspect, the handover component 424 may generate a header for the source base station 402A with an identifier identifying the source base station 402A and may generate a header for the target base station 402B with an identifier identifying the target base station 402B. The handover component 424 may then bi-cast (e.g., send) the PDUs having the same GTU-U SNs and same payloads to the source base station 402A and target base station 402B, respectively. In another aspect, the handover component 424 may generate a header having an identifier identifying the source base station 402A and an identifier identifying the target base station 402B and may send a PDU with the header having both identifiers to source base station 402A and target base station 402B. In another aspect, the handover component 424 may generate a header having a GTU-U SN and may multicast the PDU to the source base station 402A and the target base station 402B. For uplink PDUs that originated from the UE 450, the handover component 424 may receive one or more PDUs from the source base station 402A and one or more PDUs from the target base station 402B. The handover component 424 deciphers the received PDUs and stores them in the same buffer 428. The duplication component 430 may detect and discard an instance of a duplicative PDU. For example, the duplication component 430 may detect and discard an instance of a duplicative PDU from the source base station 402A. The handover component 424 then reorders the remaining PDUs in the buffer 428 and sends them to the IP services 176. Because the UPF 420 receives the same PDUs from both the source base station 402A and the target base station 402B and transmits PDUs having the same GTU-SN to both the source base station 402A and the target base station 402B, the UPF 420 is able to prevent and/or reduce HOL blocking issues.

Referring to FIG. 5, an LTE or 3 GPP handover call flow 500 is illustrated. As shown, the UE is in a connected state with data packets being transferred to/from the UE to/from the network via the source base station in both directions (e.g., downlink and uplink). At step 1, the source base station sends a measurement control request message to the UE to set the parameters to measure and set thresholds for those parameters. The purpose of the measurement control request message is to instruct the UE to send a measurement report to the network as soon as one or more thresholds are detected. At step 2, the UE sends a measurement report to the source base station after the UE meets the measurement report criteria that was previously communicated to the UE. At step 3, the source base station makes the decision to handoff the UE to a target base station using a handover algorithm and the measurement report. At step 3, the source base station can optionally issue a resource status request message to determine the load on the target base station. Based on the received source status response, the source base station can decide to proceed further in continuing the handover procedure using the X2 interface. At step 4, the source base station issues a handover request message to the target base station parsing necessary information to prepare the handover at the target base station. At step 5, the target base station checks for resource availability. If the resources are available, the target base station reserves the resources and sends a handover request acknowledgement message to the source base station. At step 7, the source base station generates and sends a radio resource control (RRC) message to the UE. The RRC message includes instructions to perform the handover and may include a RRC connection reconfiguration message including the mobility control information. At step 8, the source base station sends the target base station a status transfer message to convey the PDCP and hyper frame number (HFN) status of the E-UTRAN radio access bearers (E-RABs). The source base station starts forwarding the downlink data packets to the target base station for all of the data bearers (which are being established in the target base station during the handover request message processing) with the target base station buffering the received packets. In the meantime, at steps 9 and 10, the UE tries to access the target base station using a non-contention-based random access procedure. If successful in accessing the target base station, the UE sends the RRC connection reconfiguration complete message to the target base station at step 11. At step 12, the target base station sends a path switch request message to the MME to inform the MME that the UE has changed cells, including the tracking area identity (TAI) and evolved cell global identifier (ECGI) of the target. At step 13, the MME determines that the serving gateway can continue to serve the UE and sends a modify bearer request (target base station and tunnel endpoint identifiers (TEIDs) for downlink user plane for the accepted EPS bearers) message to the serving gateway. The modify bearer request can include the location information for the UE. At step 14, the serving gateway switches the downlink path for the UE. At step 15, the serving gateway sends downlink packets to the target base station using the newly receive addresses and TEIDs (path switched downlink data path to the target base station and a modify bearer response to the MME. The serving gateway can send one or more "end marker" packets on the old path to the source base station and can release any user plane/ TNL resources. At step 16, the MME responds to the target base station with a path switch request acknowledgement message to notify the completion of the handover. At step 17, the target base station sends a UE context release message to the source base station to release the resources. After the source base station releases the resources, the handover is complete.

In an aspect, a Path Switch Preparation procedure can be introduced, e.g., after step 8 in FIG. 5. The Path Switch Preparation procedure can trigger the UPF 420 to bi-cast, e.g., transmit the same or similar PDUs (e.g., PDUs having the same payload and same SN) to both the source base station 402A and the target base station 402B. When the source base station 402A sends the SN status transfer message to the target base station 402B, the target base station 402B can obtain information for a GTP-U tunnel between the UPF 420 and target base station 402B from the UPF 420. In an aspect, besides the two unicast tunnels, e.g., the tunnel between the UPF 420 and the source base station 402A and the tunnel between the UPF 420 and the target base station 402B, the UPF 420 may carry the GTP-U tunnel over IP multicast, similar to the M1 interface in LTE. For a flow requiring 0 ms interruption handover, the same packet of flow may be bi-casted to both the source base station 402A and the target base station 402B with the same GTP-U SN and same payload. The PDCP SN component 486 of the source base station 402A and the PDCP SN component 486 of the target base station 402B shall generate the same PDCP SN for the respective PDUs based on the GTP-U SN. In another aspect, separate GTP-U tunnels may be established for each URLLC flow. The UPF 420 may bi-cast the same packet to both the source base station 402A and to the target base station 402B using the same GTP-U SN and same payload. When a UE 450 receives PDUs from both the source base station 402A and the target base station 402B, the UE 450 may store the received PDUs in the same buffer 466 for re-ordering and duplication detection. Because the target base station 402B supports duplication detection based on the GTP-U SN, the SN Status Transfer message (e.g., step 8 of FIG. 5) may be enhanced by the source base station 402A to carry sequence number delta information. The sequence number delta information can be the delta between the PDCP SN and the GTU-U SN. After the RRC connection reconfiguration message is sent to the target base station 402B (e.g., step 11 in FIG. 5), the UE 450 may start bi-casting PDUs, e.g., sending the same or similar PDCP PDUs, to the source base station 402A and to the target base station 402B. The same or similar PDCP PDUs will have the same PDCP SN which allows the target base station 402B to detect and discard duplicative PDUs. The UPF 420 supports duplication detection, thus the UPF 420 detects and re-orders received PDUs from the source base station 402A and the target base station 402B based on SNs in the GTP-U PDUs. The sequence numbers could be PDCP SNs, GTP-U SNs or flow SNs in GTP-U extension headers. The GTP-U SNs are generated based on the PDCP SNs.

Referring to FIG. 6, a make before break URLLC handover call flow 600 is illustrated. As shown, the UE 450 transmits uplink PDUs having a PDCP SN to the source base station 402A. For each received PDU, the source base station 402A then generates a GTP-U SN, includes the GTP-U SN in a header and then sends the PDU having the GTP-U SN in the header to UPF 420. When the UE 450 sends the source base station 402A a measurement report indicating a handover condition, the source base station 402A sends a handover request to the target base station 402B. The target base station 402B responds by sending a handover command to the source base station 402A. The source base station 402A then sends a RRC reconfiguration message to the UE 450. The target base station 402B sends a Path Switch Preparation Request to the AMF/SMF ENTITY 162 requesting tunnel information. The AMF/SMF ENTITY 162 responds with a Path Switch Preparation Response along with UPF tunnel information. The AMF/SMF ENTITY 162 sends a message to the UPF 164 (e.g., UPF 420 in FIG. 4) to trigger the UPF 164 to start bi-casting PDUs to both the source base station 402A and the target base station 402B. The UPF 164 sends the same or similar downlink PDUs to both the source base station 402A and target base station 402B over one or more respective tunnels. The same or similar downlink PDUs have the same GTP-U SN and same payload. The source base station 402A and target base station 402B receive the same or similar PDUs, generate a PDCP SN based on the GTP-US SN and send PDCP PDUs having the same PDCP SN to the UE 450. The duplication component 468 of the UE 450 may perform a duplication detection on the received PDCP PDUs. Once the RRC reconfiguration is complete, the UE 450 may transmit a RRC Reconfiguration Complete message to the target base station 402B using the first radio 470 or the second radio 472. For uplink PDUs, the UE 450 may send PDCP PDUs having the same PDCP SNs to both the source base station 402A and the target base station 402B. The source base station 402A and the target base station 402B may receive the PDCP PDUs having the same PDCP SNs, may generate GTP-U SNs based on the PDCP SNs and each of the source base station 402A and the target base station 402B may forward the GTP-U PDUs having the same GTP-U SNs to the UPF 420. The duplication component 430 of the UPF 420 may perform a duplication detection on the received GTP-U PDUs. In response to receiving the RRC Reconfiguration Complete message, the target base station 402B may send a Path Switch Request to the AMF/SMF ENTITY 162. The AMF/SMF ENTITY 162 and UPF 164 may complete a bearer modification to change the target base station to the source base station. The bearer modification process may cause the UPF 420 to stop the bi-casting. The AMF/SMF ENTITY 162 may send a Path Switch Request Acknowledgement message to the target base station 402B. In response, the target base station 402B may send a UE Context Release message to the source base station 402A which causes the source base station 402A to stop the bi-casting process. In response to the UE Context Release message, the source base station 402A may send a RRC Connection Release message to the UE 450 which causes the UE 450 to stop the bi-casting.

The bi-casting process may avoid the forwarding delay for downlink transmissions. During the transition phase of a make before break handover, the bi-casting by the UPF 420 may be enabled in response to a request by the target base station 402B. For example, a Path Switch Preparation procedure may be initiated after step 8 of FIG. 5 which may trigger the UPF bi-casting PDUs to both the source base station 402A and the target base station 402B. The Path Switch Preparation procedure may include the GTP-U tunnel information between the UPF 420 and the target base station 402B to be exchanged. Besides the regular two unicast GTP-U tunnels (e.g., the GTP-U tunnel between the UPF 420 and the source base station 402A and the GTP-U tunnel between the UPF 420 and the target base station 402B), a single GTP-U tunnel over IP multicast, similar to MT interface in LTE, may be used. The bi-casting by the UE 450, source base station 402A, target base station 402B and UPF 420 results in data delivered to high layer in sequence, lossless, and without duplication. In current LTE handover, the PDCP SN is assigned by the source base station 402A and target base station 402B in a continuous manner. PDCP SNs can be used for packet loss, duplication detection and re-ordering.

In make before break handover, the PDCP SN components 486 in the source base station 402A and the target base station 402B work in parallel in the interim phase of handover. To support duplication detection, the PDCP SN components 486 in the source base station 402A and the target base station 402B assign the same SN to the same PDU received from the UPF 420. This requires the UPF 420 to bi-cast the same PDU to the source base station 402A and to the target base station 402B using the same SN in the GTP-U PDUs. Each of the source base station 402A and the target base station 402B assign the PDCP SN to the PDUs based on the GTP-U PDU SN.

If the 0 ms interruption is required only for some flows of a PDU session, the flow level SN may be assigned in the GTP-U PDUs. For a flow requiring 0 ms interruption handover, the same packet of the flow is bi-casted to both the source base station 402A and the target base station 402B with the same SN in the GTP-U PDU. The PDCP SN components 486 in the source base station 402A and the target base station 402B generate the same PDCP SN based on the SN of the GTP-U-SN.

In another aspect, separate GTP-U tunnels may be established for each URLLC flow. The UPF 420 may bi-cast the same PDUs to both the source base station 402A and the target base station 402B using the same GTP-U SN. When a UE 450 receives PDCP PDUs from both the source base station 402A and the target base station 402B, the duplication component 468 of the UE 450 will store the deciphered PDCP PDUs into the same buffer 466 and the duplication component 468 will perform a duplication procedure to discard duplicative PDCP PDUs and re-order the remaining PDCP PDUs. Even with the UPF 420 bi-casting the PDUs, when the channel of the source base station 402A fades too fast, the source base station 402A has to forward some of the unsent packets (e.g., PDUs not sent to the UE 450) to the target base station 402B. In this case, the duplication component 492 of the target base station 402B shall perform the duplication process and will discard duplicative PDUs for the forwarded PDUs without PDCP SNs. One process to do this is for the $X_n$ GTP-U to carry the same SN as the GTP-U PDU from the UPF 420. If the SN has to be different for some reason, the SN Status Transfer message, e.g., step 8 in FIG. 5, is enhanced to carry the delta between the $X_n$ GTP-U SN and the UPF GTP-U SN. The duplication component 492 of the target base station 402B may perform the duplication detection process based on the GTP-U SN. The Status Transfer message may be enhanced to carry the SN delta information.

For uplink transmissions, the make before break based 0 ms interruption handover relies on the UE duplication/bi-casting of the same PDUs (or IP packets) to the PDCP SN components 486 in the source base station 402A and the target base station 402B with the PDCP PDUs having the same PDCP SNs. The UE 450 may start the bi-casting after the RRC Reconfiguration Complete message is sent to the target base station 402B in step 11 of FIG. 5. The UPF may perform the duplication detection process and perform the re-ordering based on the PDCP SN in GTP-U extension header, GTP-U SN or the flow specific SN in the GTP-U extension header. For the GTP-U SN or flow specific SN detection, the SN in the GTP-U may be assigned based on the PDCP SN. For flow specific SN detections, if the UPF side TEID, UDP port and IP Address are the same for the two tunnels (e.g., the tunnel between the UPF 420 and the source base station 402A and the tunnel between the UPF 420 and target base station 402B), up to implementation, the UPF 420 may treat the two uplink GTP-U tunnels as one GTP tunnel. In this scenario, the re-ordering and duplication detection process may be achieved without extra processing in the UPF 420. The UE 450 may start the bi-casting/duplication to the PDCP SN components 486 in the source base station 402A and the target base station 402B after the RRC Connection Reconfiguration message is sent to the target base station 402B (e.g., step 11 of FIG. 5). For the same or similar PDU PDUs (e.g., IP packet or other payload) sent to the source base station 402A and to the target base station 402B have the same PDCP SN. The UPF 420 performs the duplication detection procedure and re-orders the received GTP-U PDUs from the source base station 402A and the target base station 402B based on the GTP-U SN. The SN may be the PDCP SN, GTP-U SN or flow SN in the GTP-U extension header. The SN in GTP-U PDUs is generated based on the PDCP SN.

Figure 7:
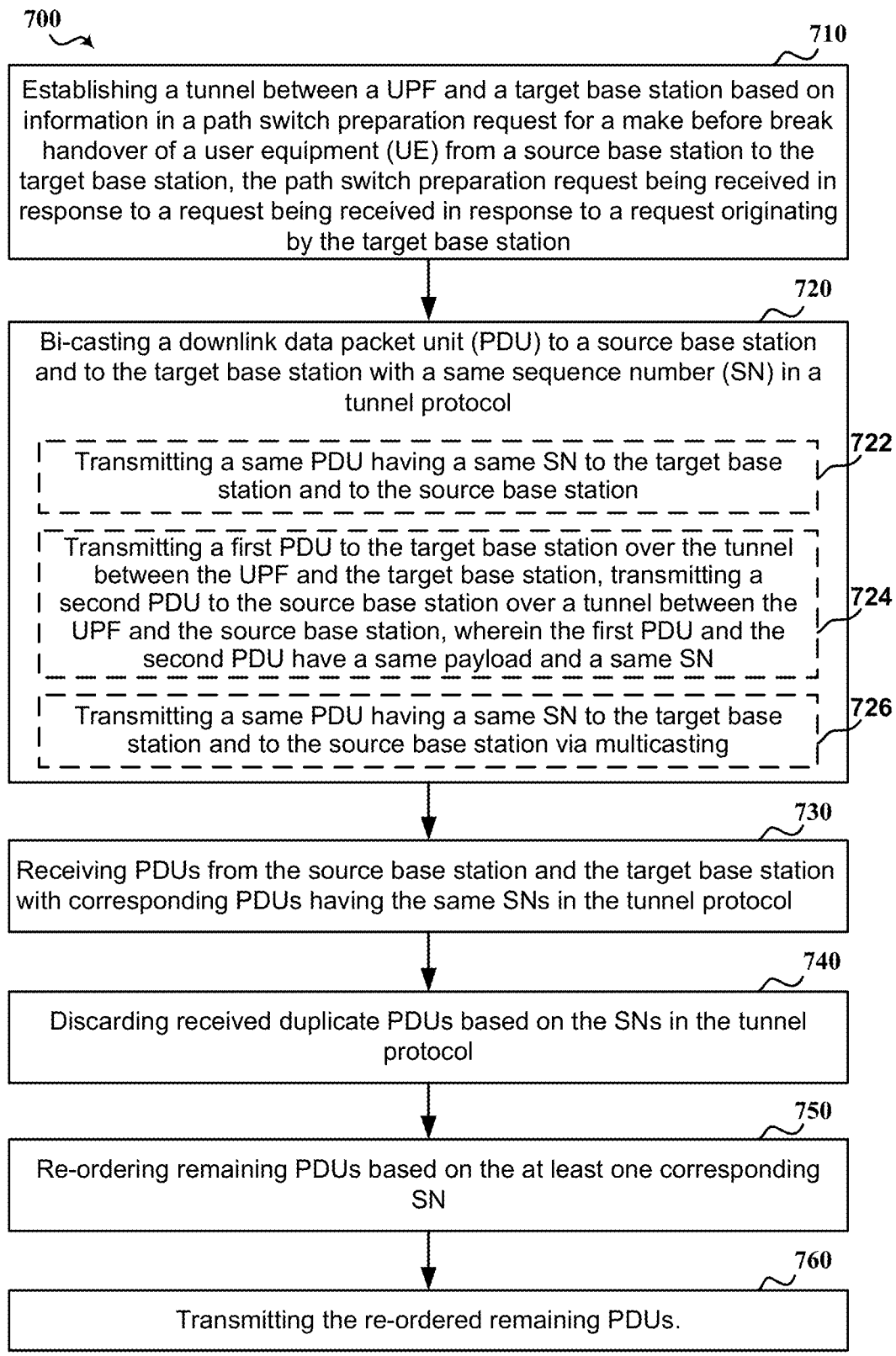
FIG. 7 is a flow diagram of an example of a method of operating a UPF to perform a handover of a UE from a source base station to a target base station.

Referring to FIG. 7, a flow diagram showing an example method 700 of operating a UPF according to the above-described aspects to handover of a UE from a source base station to a target base station includes one or more of the herein-defined actions.

At block 710, the method 700 may include establishing a tunnel between the UPF and the target base station based on information in a path switch preparation request for a make before break handover of a UE from a source base station to the target base station, the path switch preparation request being received in response to a request originating by the target base station. In an aspect, for example, the processor 1312 in conjunction with the UPF handover component 424 may establish a tunnel between the UPF 420 and the target base station 402B based on information in a path switch preparation request for a make before break handover of the UE 450 from the source base station 402A to the target base station 402B, the path switch preparation request being received in response to a request originating by the target base station.

At block 720, the method 700 may include bi-casting a downlink PDU to a source base station and to the target base station with a same SN in a tunnel protocol. In an example, the processor 1312 in conjunction with the handover component 424 and/or the GTP-U SN component 426 may bi-cast a downlink PDU to the source base station 402A and to the target base station 402B with a same SN in a tunnel protocol, e.g., GTP-U.

At block 722, the method 700 may optionally include transmitting a same PDU having the same SN to the target base station and source base station. In an aspect, for example, the processor 1312 in conjunction with the handover component 424 and/or the GTP-U SN component 426 may transmit a same PDU having the same SN to the target base station 402B and source base station 402A.

At block 724, the method 700 may optionally include transmitting a first PDU to the target base station over the tunnel between the UPF and the target base station, transmitting a second PDU to the source base station 402A over the tunnel between the UPF and the source base station, wherein the first PDU and the second PDU have the same payload and the same SN, e.g., a GTP-U SN. In an aspect, for example, the processor 1312 in conjunction with the handover component 424 and/or the GTP-U SN component 426, via transceiver 1302, may transmit a first PDU to the target base station 402B over the tunnel between the UPF 420 and the target base station 402B, transmit a second PDU to the source base station 402A over the tunnel between the UPF 420 and the source base station 402A, wherein the first PDU and the second PDU have the same payload and the same SN, e.g., a GTP-U SN.

At block 726, the method 700 may optionally include transmitting a same PDU having a same SN to the target base station and the source base station via multicasting. In an aspect, for example, the processor 1312 in conjunction with the handover component 424 and/or the GTP-U SN component 426, via the transceiver 1302, transmit a same PDU having a same SN to the target base station 402B and the source base station 402A via multicasting.

At block 730, the method 700 may include receiving PDUs from the source base station and the target base station with corresponding PDUs having the same SNs in the tunnel protocol, e.g., GTP-U. In an aspect, for example, the processor 1312 in conjunction with the handover component 424, via the transceiver 1302, may receive PDUs for the source base station 402A and the target base station 402B with corresponding PDUs have the same SNs in the tunnel protocol, e.g., GTP-U.

At block 740, the method 700 may include discarding received duplicate PDUs based on the SNs in the tunnel protocol, e.g., GTP-U. In an aspect, for example, the processor 1312 in conjunction with the handover component 424 and/or duplication component 430 may discard received duplicate PDUs based on the SNs in the tunnel protocol, e.g., GTP-U.

At block 750, the method 700 may include re-ordering remaining PDUs based on the at least one corresponding SN. In an aspect, for example, the processor 1312 in conjunction with the handover component 424 and/or duplication component 430 may re-order the remaining PDUs based on the at least corresponding SN.

At block 760, the method 700 may include transmitting the re-ordered remaining PDUS. In an aspect, for example, the processor 1312 in conjunction with the handover component 424, via the transceiver 1302, may transmit the remaining PDUs based on the at least corresponding SN.

Figure 8:
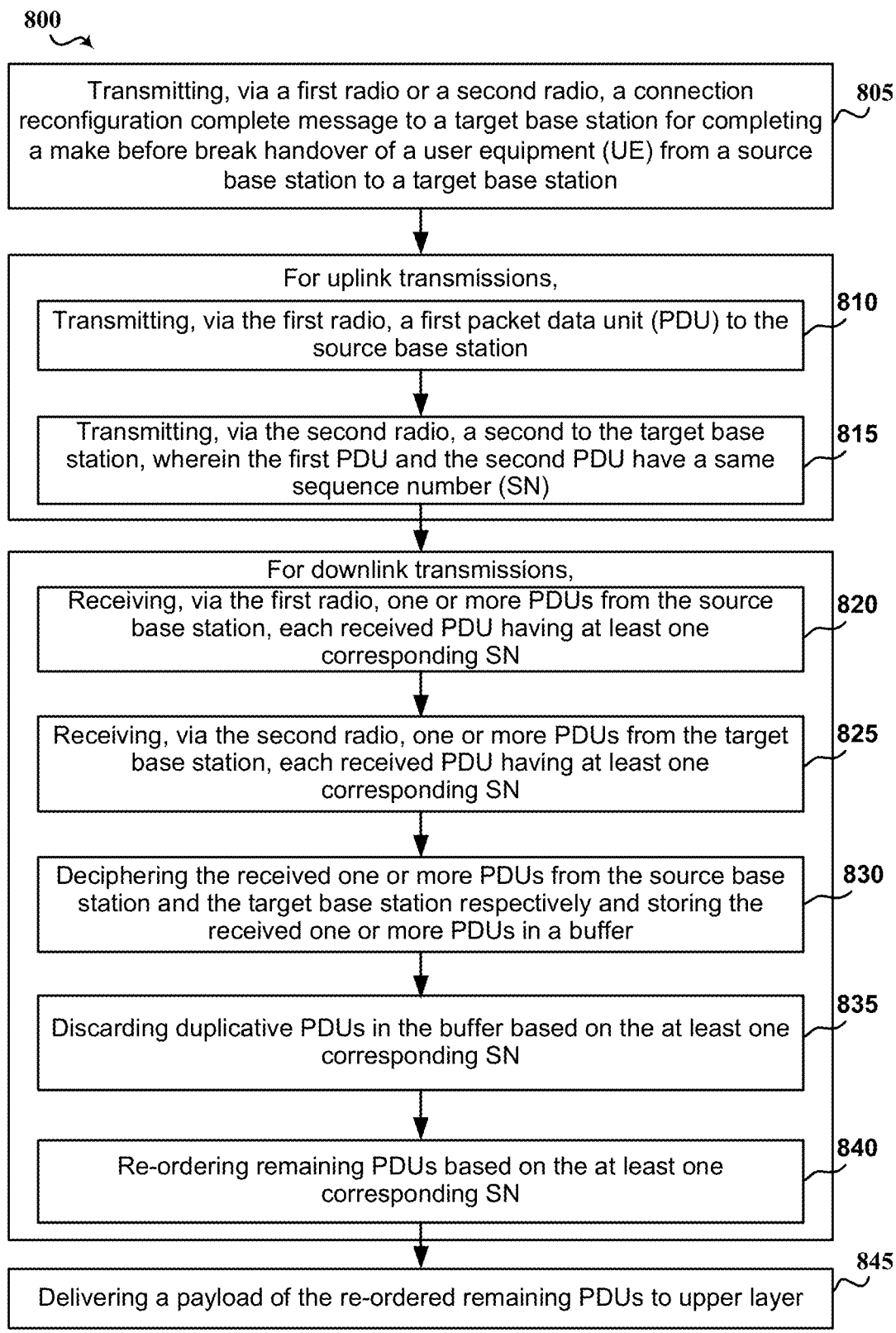
FIG. 8 is a flow diagram of an example of a method of operating a UE to perform a handover of the UE from a source base station to a target base station.

Referring to FIG. 8, a flow diagram showing an example method 800 of operating a UE according to the above-described aspects to handover of the UE from a source base station to a target base station includes one or more of the herein-defined actions.

At block 805, the method 800 may include transmitting, via a first radio or a second radio, a connection reconfiguration complete message to a target base station for completing a make before break handover of the UE from the source base station to the target base station. In an aspect, for example, the processor 1112 in conjunction with either the first radio 470 or the second radio 472 and/or the handover component 462 may transmit, via the first radio 470 or the second radio 472, a connection reconfiguration complete message to the target base station 402B for completing a make before break handover of the UE 450 from the source base station 402A to the target base station 402B.

At block 810, the method 800 may include, for uplink transmissions, transmitting, via the first radio, a first PDU to the source base station. In an aspect, for example, the processor 1112 in conjunction with the first radio 470, the handover component 462 and/or PDCP SN component 464 may transmit, the first PDU having a PDCP SN to the source base station 402A.

At block 815, the method 800 may include, for uplink transmissions, transmitting, via the second radio, a second PDU to the target base station. In an aspect, for example, the processor 1112 in conjunction with the second radio 472, the handover component 462 and/or PDCP SN component 464 may transmit, the second PDU having a PDCP SN to the target base station 402B. The first PDU and the second PDU will have the same SN, e.g., PDCP SN.

At block 820, the method 800 may include, for downlink transmissions, receiving, via the first radio, one or more PDUs from the source base station, with each receive PDU having at least one corresponding SN, e.g., PDCP SN. In an aspect, for example, the processor 1112 in conjunction with either the first radio 470, the handover component 462 and/or PDCP SN component 464 may receive, one or more PDUs from the source base station 402A, with each received PDU having at least one corresponding SN, e.g., PDCP SN.

At block 825, the method 800 may include, for downlink transmissions, receiving, via the second radio, one or more PDUs from the target base station, with each receive PDU having at least one corresponding SN, e.g., PDCP SN. In an aspect, for example, the processor 1112 in conjunction with either the second radio 472, the handover component 462 and/or PDCP SN component 464 may receive, one or more PDUs from the target base station 402B, with each received PDU having at least one corresponding SN, e.g., PDCP SN.

At block 830, the method 800 may include, deciphering the received one or more PDUs from the source base station and the target base station respectively and storing the received one or more PDUs in a buffer. In an aspect, for example, the processor 1112 in conjunction with the handover component 462 may decipher the received one or more PDUs from the source base station 402A and the target base station 402B respectively and store the received one or more PDUS in a buffer 466.

At block 835, the method 800 may include, discarding duplicative PDUs in the buffer based on the at least one corresponding SNs, e.g., PDCP SNs. In an aspect, for example, the processor 1112 in conjunction with the handover component 462 and/or duplication component 468 may discard received duplicative PDUs based on the at least one corresponding SNs, e.g., PDCP SNs.

At block 840, the method 800 may include re-ordering remaining PDUs based on the at least one corresponding SN. In an aspect, for example, the processor 1112 in conjunction with the handover component 462 and/or duplication component 468 may re-order the remaining PDUs based on the at least corresponding SN.

At block 845, the method 700 may include delivering the re-ordered remaining PDUs to upper layer. In an aspect, for example, the processor 1112 in conjunction with the transceiver 1102 and/or handover component 462 may deliver the remaining PDUs based on the at least corresponding SN.

Referring to FIG. 9, a flow diagram showing an example method 900 of operating a AMF/SMF ENTITY 162 according to the above-described aspects to handover of the UE from a source base station to a target base station includes one or more of the herein-defined actions.

At block 910, the method 900 may include receiving, from the target base station, a request for downlink bi-casting of duplicative packet data units (PDUs), the request being a path switch preparation request for a make before break handover for the UE from the source base station to the target base station, the path switch preparation request is based on a SN status transfer message and contains target base station information. In an aspect for example, the processor 1412 of the AMF/SMF ENTITY 162 may receive from the target base station 402B, via the transceiver 1402, a request for downlink bi-casting of duplicative PDUs, the request being a path switch preparation request for a make before break handover for the UE 450 from the source base station 402A to the target base station 402B, the path switch preparation request is based on a SN status transfer message and contains target base station information.

At block 920, the method 900 may include configuring the UPF to establish a tunnel between the UPF and the target base station. In an aspect, for example, the processor 1412 may configure the UPF 420 to establish a tunnel between the UPF 420 and the target base station 402B.

At block 930, the method 900 may include transmitting, to the target base station, UPF information to establish the tunnel between the target base station and the UPF using the target base station information and the UPF information. In an aspect, the processor 1412, via the transceiver 1402, may transmit, to the target base station 402B, UPF information to establish the tunnel between the target base station 402B and the UPF 420 using the target base station information and the UPF information.

Figure 10A:
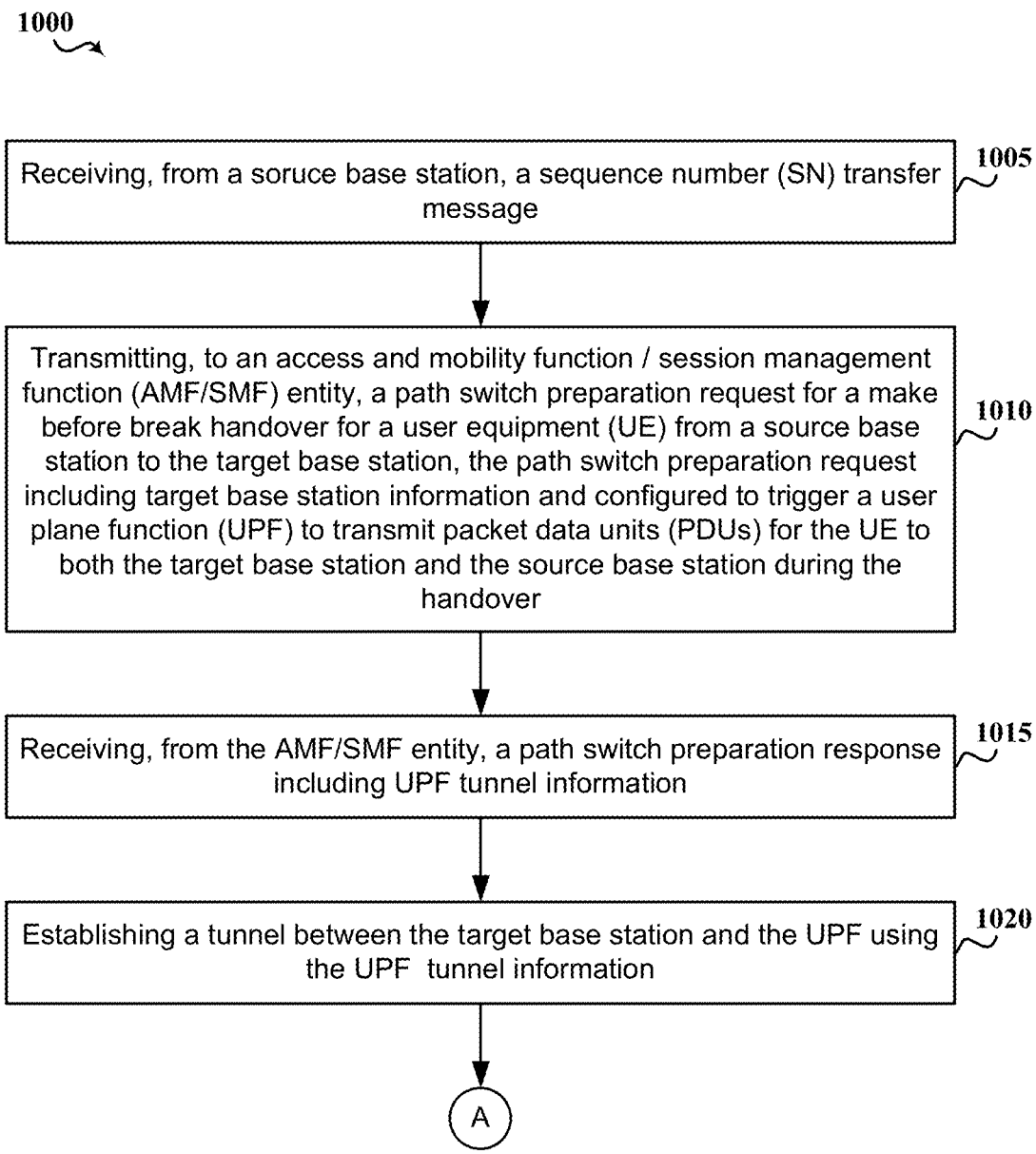
FIG. 10A-10C is a flow diagram of an example of a method of operating a target base station to perform a handover of a UE from a source base station to a target base station.
Figure 10B:
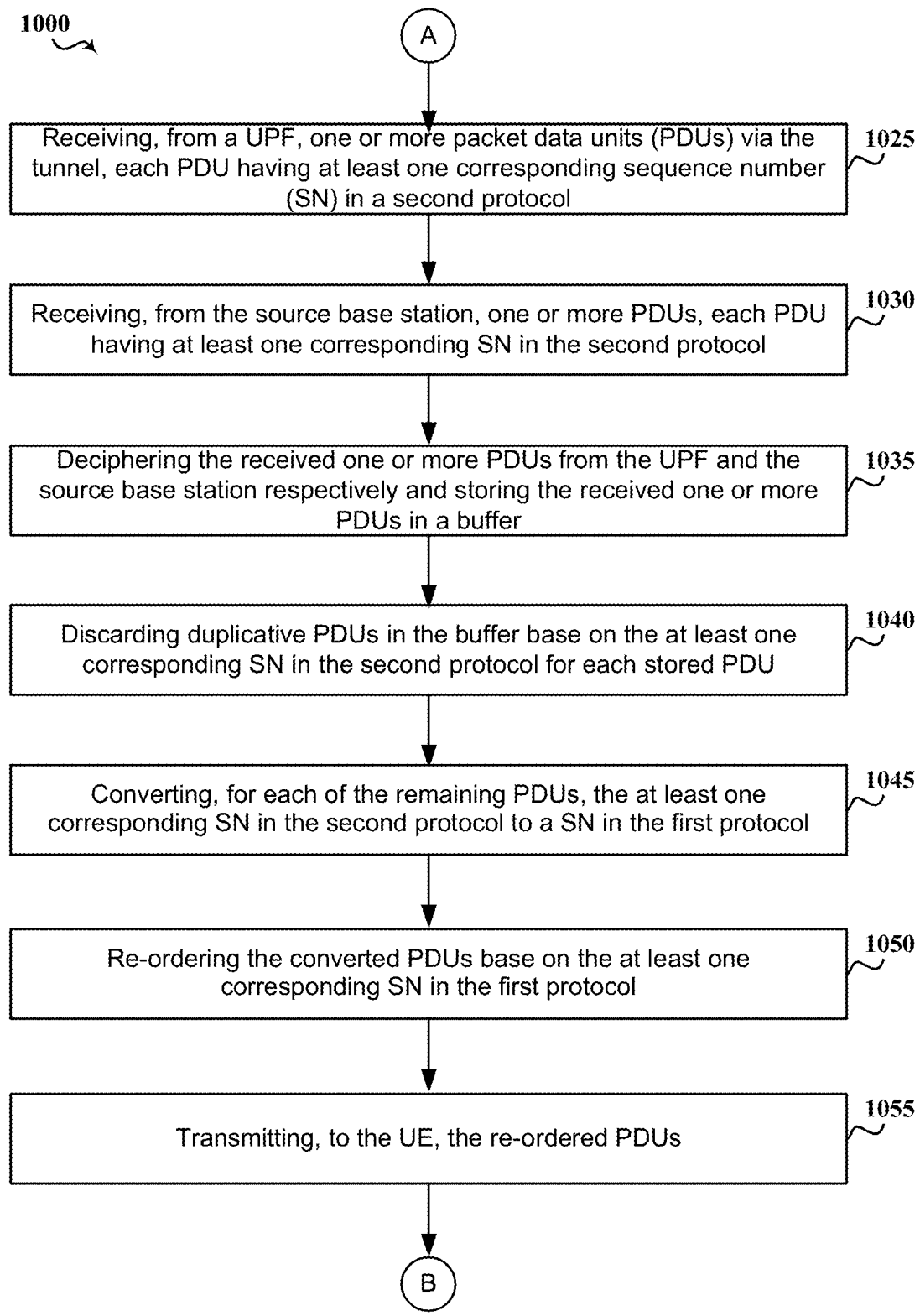
Figure 10C:
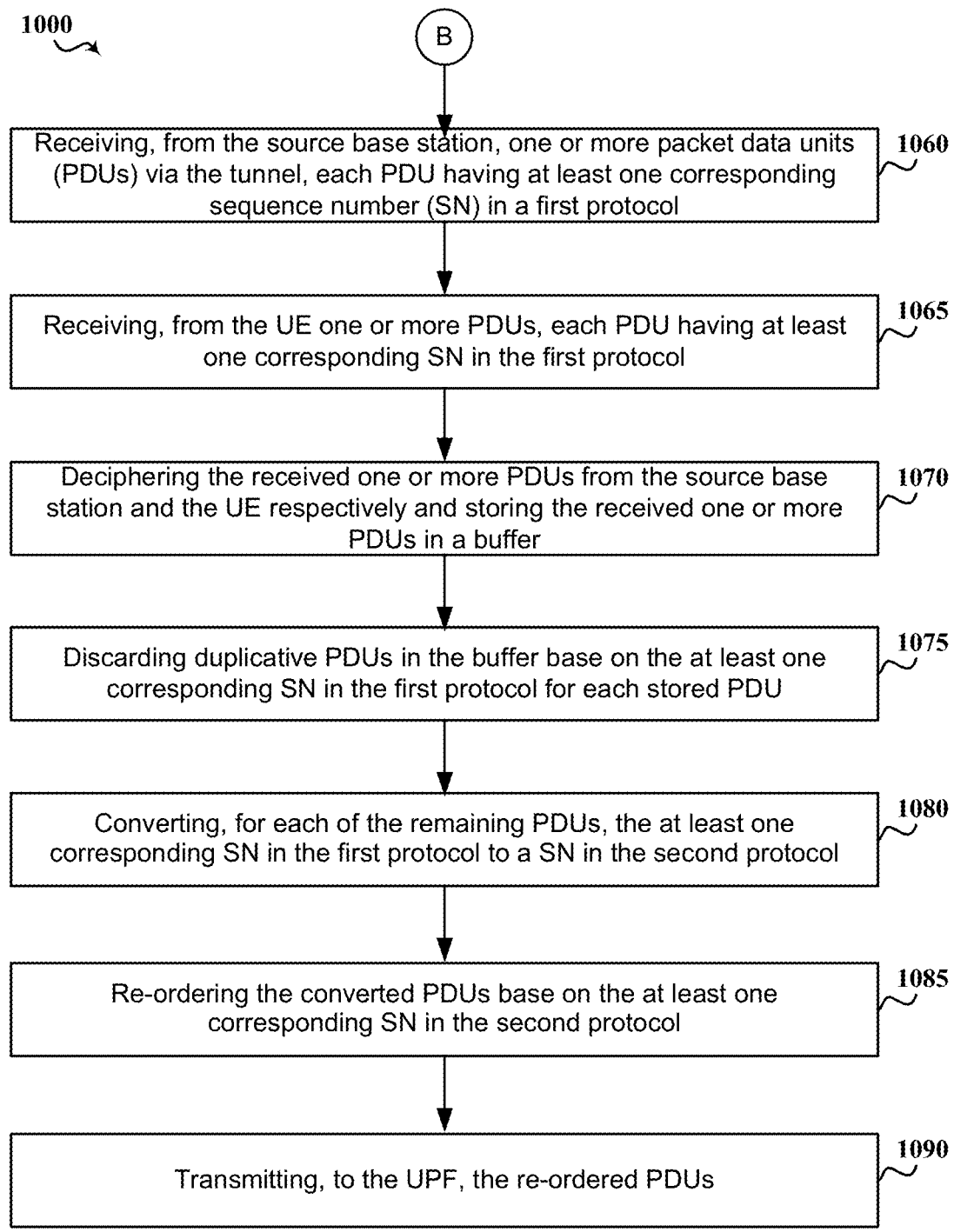

Referring to FIG. 10A-10C, a flow diagram showing an example method 1000 of operating a target base station according to the above-described aspects to handover of the UE from a source base station to a target base station includes one or more of the herein-defined actions.

At block 1005, the method 1000 may include receiving, from a source base station, a SN transfer message. In an aspect, for example, the processor 1212 in conjunction with the handover component 484 and via the transceiver 1202, may receive, from the source base station 402A, a SN transfer message.

At block 1010, the method 1000 may include transmitting, to the AMF/SMF entity, a path switch preparation request for a make before break handover for the UE from the source base station to the target base station, the path switch preparation request including target base station tunnel information and configured to trigger a UPF to transmit PDUs for the UE to both the target base station and the source base station during the handover. In an aspect, for example, the processor 1212 in conjunction with the handover component 484, via the transceiver 1202, may transmit, to the AMF/SMF entity 162, a path switch preparation request for a make before break handover for the UE 450 from the source base station 402A to target base station 402B, the path switch preparation request including target base station tunnel information and configured to trigger the UPF 420 to transmit PDUs for the UE 450 to both the target base station 402B and the source base station 402A during the handover.

At block 1015, the method 1000 may include receiving, from the AMF/SMF entity 162, a path switch preparation response including UPF tunnel information. In an aspect, for example, the processor 1212 in conjunction with the handover component 484, via the transceiver 1202, may receive the path switch preparation response including UPF tunnel information.

At block 1020, the method 1000 may include establishing a tunnel between the target base station and the UPF using the UPF tunnel information. In an aspect, for example, the processor 1212 in conjunction with the handover component 484, via the transceiver 1202, may establish the tunnel between the target base station 402B and the UPF 420 using the UPF tunnel information.

At block 1025, the method 1000 may include receiving, from the UPF, one or more PDUs via the tunnel, each PDU having at least one corresponding SN in the second protocol, e.g., GTP-U. In an aspect, for example, the processor 1212 in conjunction with the handover component 484, via the transceiver 1202, may receive, from the UPF 420, one or more PDUs via the tunnel, each PDU having at least one corresponding SN in the second protocol, e.g., GTP-U.

At block 1030, the method 1000 may include receiving, from the source base station, one or more PDUs, each PDU having at least one corresponding SN in the second protocol, e.g., GTP-U. In an aspect, for example, the processor 1212 in conjunction with the handover component 484, via the transceiver 1202, may receive, from the source base station 402A, one or more PDUs, each PDU having at least one corresponding SN in the second protocol, e.g., GTP-U.

At block 1035, the method 1000 may include, deciphering the received one or more PDUs from the UPF and the source base station respectively and storing the received one or more PDUS in a buffer. In an aspect, for example, the processor 1212 in conjunction with the handover component 484 may decipher the received one or more PDUs from the UPF 420 and the source base station 402A respectively and store the received one or more PDUS in a buffer 490.

At block 1040, the method 1000 may include, discarding duplicative PDUs in the buffer based on the at least one corresponding SNs, e.g., GTP-U SNs. In an aspect, for example, the processor 1212 in conjunction with the handover component 484 and/or duplication component 492 may discard received duplicative PDUs based on the at least one corresponding SNs, e.g., GTP-U SNs.

At block 1045, the method 1000 may include converting, for each of the remaining PDUs, the at least one corresponding SN in the second protocol to a SN in the first protocol. In an aspect, for example, the processor 1212 in conjunction with the handover component 484 and/or PDCP SN component 486 may convert, for each of the remaining PDUs, the at least one corresponding SN in the second protocol to a SN in the first protocol. For example, GTP-U SNs may be converted to PDCP SNs based on the GTP-U SN.

At block 1050, the method 1000 may include re-ordering remaining PDUs based on the at least one corresponding SN in the first protocol, e.g., PDCP. In an aspect, for example, the processor 1212 in conjunction with the handover component 484 and/or duplication component 492 may re-order the remaining PDUs based on the at least corresponding SN.

At block 1055, the method 1000 may include transmitting the re-ordered remaining PDUs to the UE. In an aspect, for example, the processor 1212 in conjunction with the transceiver 1202 and/or handover component 484 may transmit the re-ordered remaining PDUs to the UE 450 based on the at least corresponding SN.

At block 1060, the method 1000 may include receiving, from the source base station, one or more PDUs via the tunnel, each PDU having at least one corresponding SN in the first protocol, e.g., PDCP. In an aspect, for example, the processor 1212 in conjunction with the handover component 484, via the transceiver 1202, may receive, from the source base station 402A, one or more PDUs via the tunnel, each PDU having at least one corresponding SN in the first protocol, e.g., PDCP.

At block 1065, the method 1000 may include receiving, from the UE, one or more PDUs, each PDU having at least one corresponding SN in the first protocol, e.g., PDCP. In an aspect, for example, the processor 1212 in conjunction with the handover component 484, via the transceiver 1202, may receive, from the UE 450, one or more PDUs, each PDU having at least one corresponding SN in the first protocol, e.g., PDCP.

At block 1070, the method 1000 may include, deciphering the received one or more PDUs from the source base station and the UE respectively and storing the received one or more PDUs in a buffer. In an aspect, for example, the processor 1212 in conjunction with the handover component 484 may decipher the received one or more PDUs from the source base station 402A and the UE 450 respectively and store the received one or more PDUs in a buffer 490.

At block 1075, the method 1000 may include, discarding duplicative PDUs in the buffer based on the at least one corresponding SNs, e.g., PDCP SNs. In an aspect, for example, the processor 1212 in conjunction with the handover component 484 and/or duplication component 492 may discard received duplicative PDUs based on the at least one corresponding SNs, e.g., PDCP SNs.

At block 1080, the method 1000 may include converting, for each of the remaining PDUs, the at least one corresponding SN in the first protocol to a SN in the second protocol. In an aspect, for example, the processor 1212 in conjunction with the handover component 484 and/or GTP-U SN component 488 may convert, for each of the remaining PDUs, the at least one corresponding SN in the first protocol to a SN in the second protocol. For example, PDCP SNs may be converted to GTP-U SNs based on the PDCP SN.

At block 1085, the method 1000 may include re-ordering remaining PDUs based on the at least one corresponding SN in the second protocol, e.g., GTP-U. In an aspect, for example, the processor 1212 in conjunction with the handover component 484 and/or duplication component 492 may re-order the remaining PDUs based on the at least corresponding SN.

At block 1090, the method 1000 may include transmitting the re-ordered remaining PDUs to the UPF. In an aspect, for example, the processor 1212 in conjunction with the transceiver 1202 and/or handover component 484 may transmit the re-ordered remaining PDUs to the UPF 420 based on the at least corresponding SN.

Figure 11:
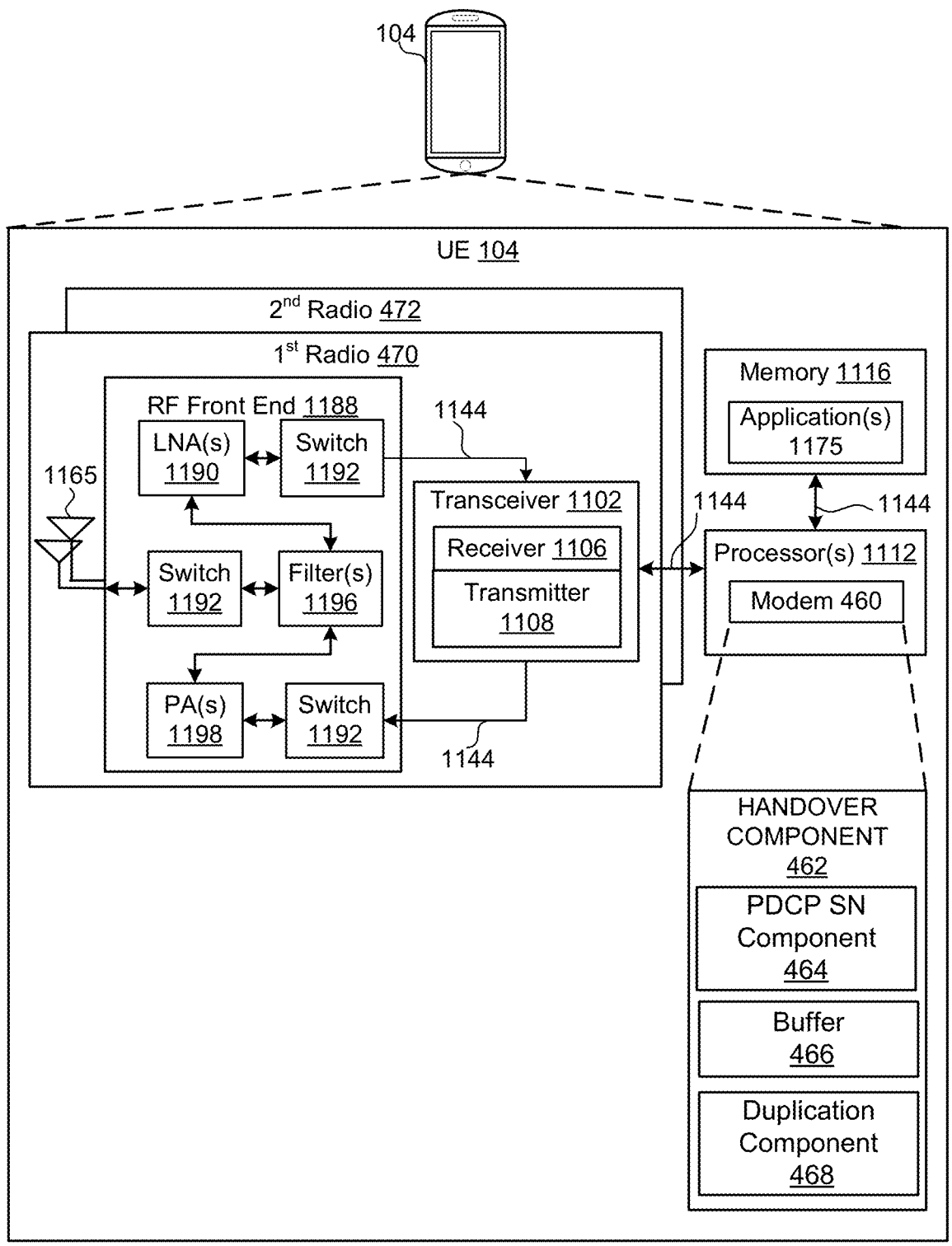
FIG. 11 is a schematic diagram of example components of the UE of FIG. 2.

Referring to FIG. 11 one example of an implementation of UE 450 may include a variety of components, some of which have already been described above, but including components such as one or more processors 1112 and memory 1116 and transceiver 1102 in communication via one or more buses 1144, which may operate in conjunction with modem 460 and handover component 462 to enable one or more of the functions described herein related to make before break handovers. Further, the one or more processors 1112, modem 460, memory 1116, transceiver 1102, RF front end 1188 and one or more antennas 1165, may be configured to support voice and/or data calls (simultaneously or non-simultaneously) in one or more radio access technologies. The one or more antennas 1165 may include one or more antennas, antenna elements and/or antenna arrays.

In an aspect, the one or more processors 1112 can include a modem 460 that uses one or more modem processors. The various functions related to handover component 462 may be included in modem 460 and/or processors 1112 and, in an aspect, can be executed by a single processor, while in other aspects, different ones of the functions may be executed by a combination of two or more different processors. For example, in an aspect, the one or more processors 1112 may include any one or any combination of a modem processor, or a baseband processor, or a digital signal processor, or a transmit processor, or a receiver processor, or a transceiver processor associated with transceiver 1102. In other aspects, some of the features of the one or more processors 1112 and/or modem 460 associated with handover component 462 may be performed by transceiver 1102.

Also, memory 1116 may be configured to store data used herein and/or local versions of applications 1175 or handover component 462 and/or one or more of its subcomponents being executed by at least one processor 1112. Memory 1116 can include any type of computer-readable medium usable by a computer or at least one processor 1112, such as random access memory (RAM), read only memory (ROM), tapes, magnetic discs, optical discs, volatile memory, non-volatile memory, and any combination thereof. In an aspect, for example, memory 1116 may be a non-transitory computer-readable storage medium that stores one or more computer-executable codes defining handover component 462 and/or one or more of its subcomponents, and/or data associated therewith, when UE 450 is operating at least one processor 1112 to execute handover component 462 and/or one or more of its subcomponents.

Transceiver 1102 may include at least one receiver 1106 and at least one transmitter 1108. Receiver 1106 may include hardware, firmware, and/or software code executable by a processor for receiving data, the code comprising instructions and being stored in a memory (e.g., computer-readable medium). Receiver 1106 may be, for example, a radio frequency (RF) receiver. In an aspect, receiver 1106 may receive signals transmitted by at least one base station 402. Additionally, receiver 1106 may process such received signals, and also may obtain measurements of the signals, such as, but not limited to, Ec/Io, SNR, RSRP, RSSI, etc. Transmitter 1108 may include hardware, firmware, and/or software code executable by a processor for transmitting data, the code comprising instructions and being stored in a memory (e.g., computer-readable medium). A suitable example of transmitter 1108 may including, but is not limited to, an RF transmitter.

Moreover, in an aspect, UE 450 may include RF front end 1188, which may operate in communication with one or more antennas 1165 and transceiver 1102 for receiving and transmitting radio transmissions, for example, wireless communications transmitted by at least one base station 402 or wireless transmissions transmitted by UE 450. RF front end 1188 may be connected to one or more antennas 1165 and can include one or more low-noise amplifiers (LNAs) 1190, one or more switches 1192, one or more power amplifiers (PAs) 1198, and one or more filters 1196 for transmitting and receiving RF signals.

In an aspect, LNA 1190 can amplify a received signal at a desired output level. In an aspect, each LNA 1190 may have a specified minimum and maximum gain values. In an aspect, RF front end 1188 may use one or more switches 1192 to select a particular LNA 1190 and its specified gain value based on a desired gain value for a particular application.

Further, for example, one or more PA(s) 1198 may be used by RF front end 1188 to amplify a signal for an RF output at a desired output power level. In an aspect, each PA 1198 may have specified minimum and maximum gain values. In an aspect, RF front end 1188 may use one or more switches 1192 to select a particular PA 1198 and its specified gain value based on a desired gain value for a particular application.

Also, for example, one or more filters 1196 can be used by RF front end 1188 to filter a received signal to obtain an input RF signal. Similarly, in an aspect, for example, a respective filter 1196 can be used to filter an output from a respective PA 1198 to produce an output signal for transmission. In an aspect, each filter 1196 can be connected to a specific LNA 1190 and/or PA 1198. In an aspect, RF front end 1188 can use one or more switches 1192 to select a transmit or receive path using a specified filter 1196, LNA 1190, and/or PA 1198, based on a configuration as specified by transceiver 1202 and/or processor 1112.

As such, transceiver 1102 may be configured to transmit and receive wireless signals through one or more antennas 1165 via RF front end 1188. In an aspect, transceiver may be tuned to operate at specified frequencies such that UE 450 can communicate with, for example, one or more base stations 402 or one or more cells associated with one or more base stations 402. In an aspect, for example, modem 460 can configure transceiver 1102 to operate at a specified frequency and power level based on the UE configuration of the UE 450 and the communication protocol used by modem 460.

In an aspect, modem 460 can be a multiband-multimode modem, which can process digital data and communicate with transceiver 1102 such that the digital data is sent and received using transceiver 1102. In an aspect, modem 460 can be multiband and be configured to support multiple frequency bands for a specific communications protocol. In an aspect, modem 460 can be multimode and be configured to support multiple operating networks and communications protocols. In an aspect, modem 460 can control one or more components of UE 450 (e.g., RF front end 1188, transceiver 1102) to enable transmission and/or reception of signals from the network based on a specified modem configuration. In an aspect, the modem configuration can be based on the mode of the modem and the frequency band in use. In another aspect, the modem configuration can be based on UE configuration information associated with UE 450 as provided by the network during cell selection and/or cell reselection.

Figure 12:
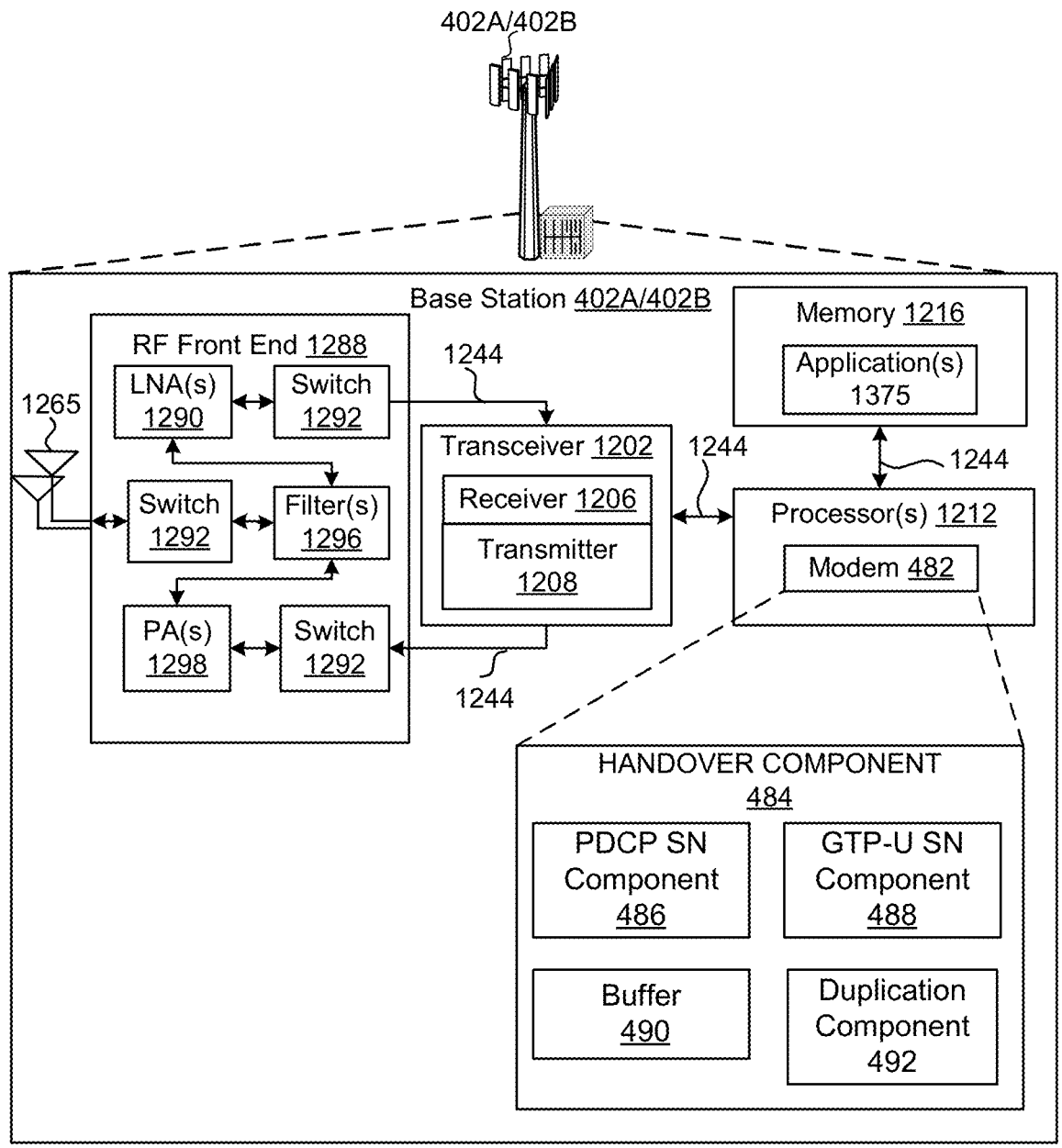
FIG. 12 is a schematic diagram of example components of the base stations of FIG. 2.

Referring to FIG. 12, one example of an implementation of base station 102 may include a variety of components, some of which have already been described above, but including components such as one or more processors 1212 and memory 1216 and transceiver 1202 in communication via one or more buses 1244, which may operate in conjunction with modem 482 and handover component 484 to enable one or more of the functions described herein related to handover of a UE 450 from a source base station 402A to a target base station 402B.

The transceiver 1202, receiver 1206, transmitter 1208, one or more processors 1212, memory 1216, applications 1275, buses 1244, RF front end 1288, LNAs 1290, switches 1292, filters 1296, PAs 1298, and one or more antennas 1265 may be the same as or similar to the corresponding components of UE 104/450, as described above, but configured or otherwise programmed for base station operations as opposed to UE operations.

Figure 13:
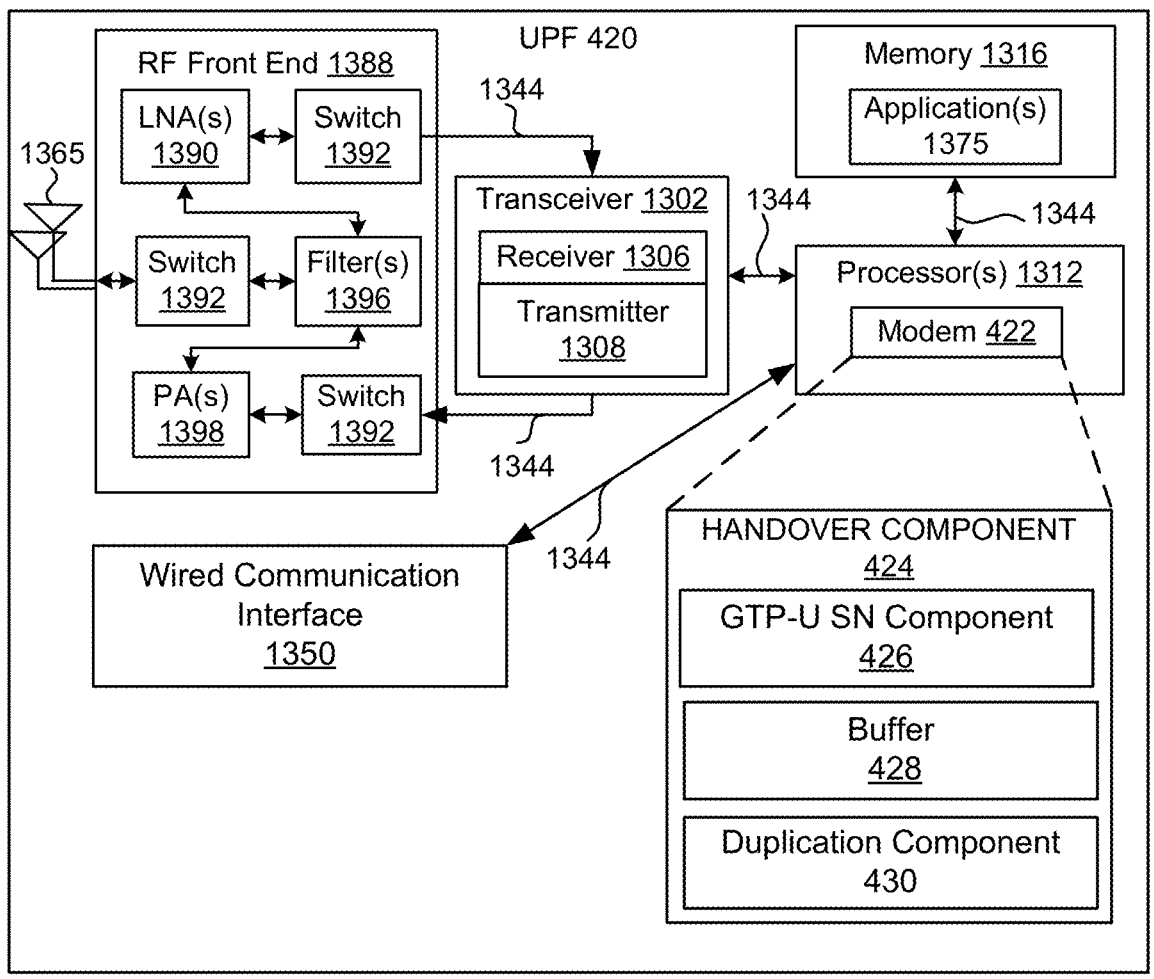
FIG. 13 is a schematic diagram of example components of the UPF of FIG. 2.
Figure 14:
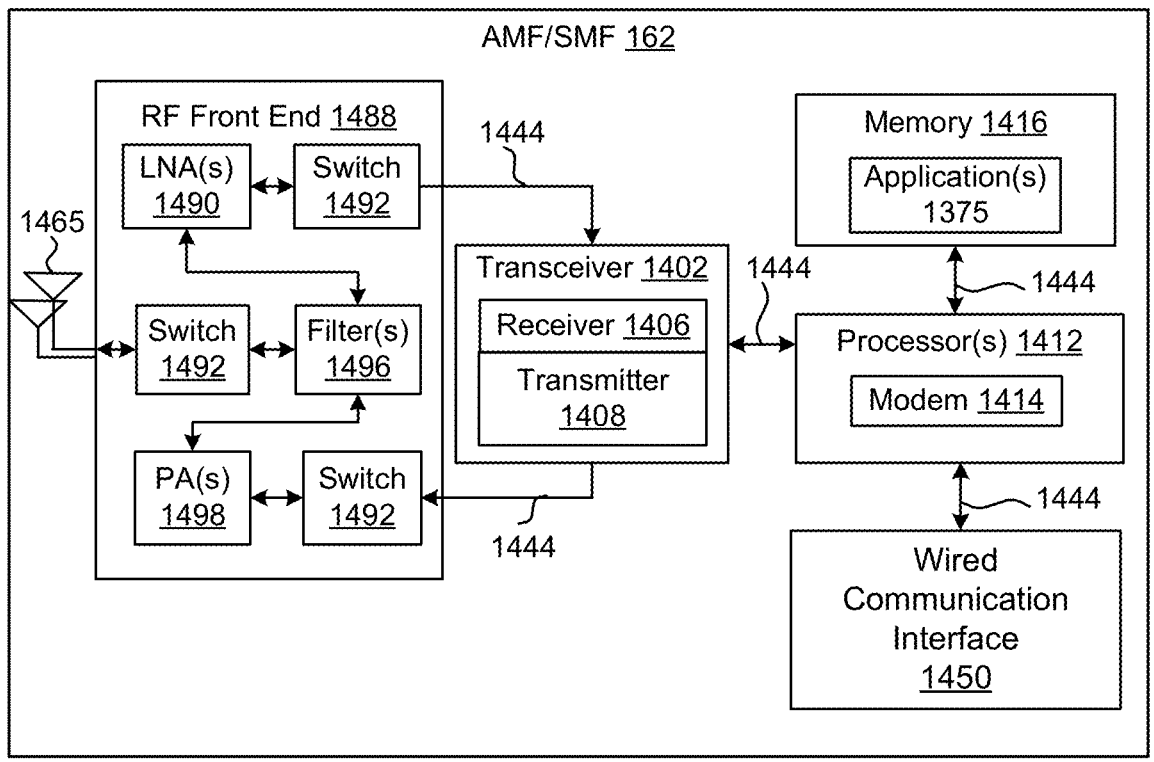
FIG. 14 is a schematic diagram of example components of the AMF/SMF entity of FIG. 2.

Referring to FIG. 13, one example of an implementation of UPF 420 may include a variety of components, some of which have already been described above, but including components such as one or more processors 1312 and memory 1316 and transceiver 1302 in communication via one or more buses 1344, which may operate in conjunction with modem 482 and handover component 424 to enable one or more of the functions described herein related to handover of a UE 104/450 from a source base station 402A to a target base station 402B. In another example, the UPF 420 may include a wired communication interface 1350 which may operate in conjunction with modem 482 and handover component 424 to enable one or more of the functions described herein related to handover of a UE 104/450 from a source base station 402A to a target base station 402B. The transceiver 1302, receiver 1306, transmitter 1308, one or more processors 1313, memory 1316, applications 1375, buses 1344, RF front end 1388, LNAs 1390, switches 1392, filters 1396, PAs 1398, and one or more antennas 1365 may be the same as or similar to the corresponding components of UE 104, as described above, but configured or otherwise programmed for UPF operations as opposed to UE operations. Referring to FIG. 14, one example of an implementation of AMF/SMF ENTITY 162 may include a variety of components, some of which have already been described above, but including components such as one or more processors 1412 and memory 1416 and transceiver 1402 in communication via one or more buses 1444, which may operate in conjunction with modem 482 and handover component 484 to enable one or more of the functions described herein related to handover of a UE 104/450 from a source base station 402A to a target base station 402B. In another example, the AMF/SMF ENTITY 162 may include a wired communication interface 1450 which may operate in conjunction with modem 482 and handover component 424 to enable one or more of the functions described herein related to handover of a UE 104/450 from a source base station 402A to a target base station 402B. The transceiver 1402, receiver 1406, transmitter 1408, one or more processors 1414, memory 1416, applications 1475, buses 1444, RF front end 1488, LNAs 1490, switches 1492, filters 1496, PAs 1498, and one or more antennas 1465 may be the same as or similar to the corresponding components of UE 104, as described above, but configured or otherwise programmed for AMF/SMF operations as opposed to UE operations.

The above detailed description set forth above in connection with the appended drawings describes examples and does not represent the only examples that may be implemented or that are within the scope of the claims. The term "example," when used in this description, means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, computer-executable code or instructions stored on a computer-readable medium, or any combination thereof.

The various illustrative blocks and components described in connection with the disclosure herein may be implemented or performed with a specially-programmed device, such as but not limited to a processor, a digital signal processor (DSP), an ASIC, a FPGA or other programmable logic device, a discrete gate or transistor logic, a discrete hardware component, or any combination thereof designed to perform the functions described herein. A specially-programmed processor may be a microprocessor, but in the alternative, the processor may be any conventional processor, controller, microcontroller, or state machine. A specially-programmed processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a non-transitory computer-readable medium. Other examples and implementations are within the scope and spirit of the disclosure and appended claims. For example, due to the nature of software, functions described above can be implemented using software executed by a specially programmed processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the common principles defined herein may be applied to other variations without departing from the spirit or scope of the disclosure. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise. Thus, the disclosure is not to be limited to the examples and designs described herein but is to be accorded the widest scope consistent with the principles and novel features disclosed herein.

SOME FURTHER EXAMPLE EMBODIMENTS

An example method of handover in wireless communication for a user plane function (UPF) comprising: establishing a tunnel between the UPF and a target base station based on information in a path switch preparation request for a make before break handover of a user equipment (UE) from a source base station to the target base station, the path switch preparation request being received in response to a request originating by the target base station; bi-casting a downlink data packet unit (PDU) to a source base station and to the target base station with a same sequence number (SN) in a tunnel protocol; receiving PDUs from the source base station and the target base station with corresponding PDUs having the same SNs in the tunnel protocol; and discarding received duplicate PDUs based on the SNs in the tunnel protocol.

The above example method, wherein the bi-casting of the downlink PDU comprises transmitting a same PDU having a same SN to the target base station and to the source base station.

One or more of the above example methods, wherein the bi-casting of the downlink PDU comprises: transmitting a first PDU to the target base station over the tunnel between the UPF and the target base station; and transmitting a second PDU to the source base station over a tunnel between the UPF and the source base station, wherein the first PDU and the second PDU have a same payload and a same SN.

One or more of the above example methods, wherein the first PDU includes a target base station identifier and the second PDU includes a source base station identifier.

One or more of the above example methods, wherein each of the first PDU and the second PDU includes a target base station identifier and a source base station identifier.

One or more of the above example methods, wherein the PDUs received from the target base station are received over a tunnel between the target base station and the UPF and the PDUs received from the source base station are received over a tunnel between the source base station and the UPF, with each received PDU having at least one corresponding SN, and the discarding of the received duplicate PDUs are discarded based on the at least one corresponding SN, the method further comprising: re-ordering remaining PDUs based on the at least one corresponding SN; and transmitting the re-ordered remaining PDUs.

One or more of the above example methods, wherein the at least one corresponding SN is at least one of a packet data convergence protocol (PDCP) SN, a general packet radio service (GPRS) tunneling protocol (GTP) user data (GTP-U) PDU SN, or a flow specific sequence number, wherein the corresponding SN is generated by the source base station and the target base station based on the PDCP SN.

One or more of the above example methods, wherein the corresponding SN is a general packet radio service (GPRS) tunneling protocol (GTP) user data (GTP-U) PDU SN.

One or more of the above example methods, wherein each of the tunnels are general packet radio service (GPRS) tunneling protocol (GTP) user data (GTP-U) tunnels.

One or more of the above example methods, wherein the bi-casting of the downlink PDU comprises transmitting a same PDU having a same SN to the target base station and to the source base station via multicasting.

An example device (e.g., a user plane function (UPF)) comprising: a transceiver, a memory configured to store instructions, and one or more processors communicatively coupled with the transceiver and the memory, wherein the one or more processors are configured to perform all or part of one or more of the above example methods.

An example device (e.g., a user plane function (UPF)) comprising means for wireless communication, means for storing instructions and data, and means for performing all or part of one or more of the above example methods.

A second example method of handover in wireless communications for a user equipment (UE) comprising: transmitting, via a first radio or a second radio of the UE, a connection reconfiguration complete message to a target base station for completing a make before break handover of a user equipment (UE) from a source base station to a target base station; and for uplink transmissions, transmitting, via the first radio, a first packet data unit (PDU) to the source base station; transmitting, via the second radio, a second PDU to the target base station, wherein the first PDU and the second PDU have a same sequence number (SN); for downlink transmission, receiving, via the first radio, one or more PDUs from the source base station, each received PDU having at least one corresponding SN; receiving, via the second radio, one or more PDUs from the target base station, each received PDU having at least one corresponding SN; deciphering the received one or more PDUs from the source base station and the target base station respectively and storing the received one or more PDUs in a buffer; discarding duplicative PDUs in the buffer based on the at least one corresponding SN for each received PDU; and re-ordering remaining PDUs based on the at least one corresponding SN.

The above example method, wherein the at least one corresponding SN for each PDU is a packet data convergence protocol (PDCP) SN.

One or more of the above example methods, further comprising delivering a payload of the re-ordered remaining PDUs to upper layer.

One or more of the above example methods, wherein the first PDU includes a source base station identifier and the second PDU includes a target base station identifier.

One or more of the above example methods, wherein each of the first PDU and the second PDU includes a target base station identifier and a source base station identifier.

An example device (e.g., a user equipment (UE)) comprising: a transceiver, a memory configured to store instructions, and one or more processors communicatively coupled with the transceiver and the memory, wherein the one or more processors are configured to perform all or part of one or more of the above example methods.

An example device (e.g., a user equipment (UE)) comprising means for wireless communication, means for storing instructions and data, and means for performing all or part of one or more of the above example methods.

A third example method of handover in wireless communications for a target base station comprising: receiving, from a source base station, a sequence number (SN) transfer message; transmitting, to an access and mobility function/session management function (AMF/SMF) entity, a path switch preparation request for a make before break handover for a user equipment (UE) from the source base station to the target base station, the path switch preparation request including target base station tunnel information and configured to trigger a user plane function (UPF) to transmit packet data units (PDUs) for the UE to both the target base station and the source base station during the handover; receiving, from the AMF/SMF entity, a path switch preparation response including UPF tunnel information; and establishing a tunnel between the target base station and the UPF using the UPF tunnel information.

The above example method, wherein the SN transfer message includes a delta between a SN in a first protocol and a SN in a second protocol.

One or more of the above example methods, further comprising: receiving, from the UPF, one or more packet data units (PDUs) via the tunnel, each PDU having at least one corresponding sequence number (SN) in the second protocol; receiving, from the source base station, one or more PDUs, each PDU having at least one corresponding SN in the second protocol; deciphering the received one or more PDUs from the UPF and the source base station respectively and storing the received one or more PDUs in a buffer; discarding duplicative PDUs in the buffer based on the at least one corresponding SN in the second protocol; converting, for each of the remaining PDUs, the at least one corresponding SN in the second protocol to a SN in the first protocol; re-ordering the converted PDUs based on the at least one corresponding SN in the first protocol; and transmitting, to the UE, the re-ordered PDUs.

One or more of the above example methods, wherein the at least one corresponding SN is at least one of a packet data convergence protocol (PDCP) SN, a GTP-U PDU SN, or a flow specific SN, and wherein the corresponding SN is generated by the source base station and the UPF based on the PDCP SN.

One or more of the above example methods, further comprising: receiving, from the source base station, one or more PDUs, each PDU having at least one corresponding SN in the first protocol; receiving, from the UE, one or more PDUS, each PDU having at least one corresponding SN in the first protocol; deciphering the received one or more PDUs from the source base station and the UE respectively and storing the received one or more PDUs in a buffer; discarding duplicative PDUs in the buffer based on the at least one corresponding SN in the first protocol; converting, for each of the remaining PDUs having at least one corresponding SN in the first protocol to a SN in the second protocol; re-ordering the converted PDUs based on the at least one corresponding SN in the second protocol; and transmitting, to the UPF, the re-ordered PDUs.

One or more of the above example methods, wherein the corresponding SN is a packet data convergence protocol (PDCP) SN.

An example device (e.g., a target base station) comprising: a transceiver, a memory configured to store instructions, and one or more processors communicatively coupled with the transceiver and the memory, wherein the one or more processors are configured to perform all or part of one or more of the above example methods.

An example device (e.g., a target base station) comprising means for wireless communication, means for storing instructions and data, and means for performing all or part of one or more of the above example methods.

A fourth example method of handover in wireless communications for an access and mobility function/session management function (AMF/SMF) entity comprising: receiving, from a target base station, a request for downlink bi-casting of duplicative packet data units (PDUs), the request being a path switch preparation request for a make before break handover for a user equipment (UE) from a source base station to the target base station, the path switch preparation request is based on a sequence number (SN) status transfer message and contains target base station information; configuring a user plane function (UPF) to establish a tunnel between the UPF and the target base station; and transmitting, to the target base station, UPF information to establish the tunnel between the target base station and the UF using the target base station information and the UPF information.

An example device (e.g., an access and mobility function/session management function (AMF/SMF) entity) comprising: a transceiver, a memory configured to store instructions, and one or more processors communicatively coupled with the transceiver and the memory, wherein the one or more processors are configured to perform all or part of one or more of the above example methods.

An example device (e.g., an access and mobility function/session management function (AMF/SMF) entity) comprising means for wireless communication, means for storing instructions and data, and means for performing all or part of one or more of the above example methods.

What is claimed is:

1. A method of handover in wireless communication for a user equipment (UE) comprising:
   transmitting, via a first radio or a second radio of the UE, a connection reconfiguration complete message to a target base station for completing a make before break handover of a user equipment (UE) from a source base station to a target base station; and
   for uplink transmissions, subsequent to transmitting the connection reconfiguration complete message,
      transmitting, via the first radio, a first packet data unit (PDU) to the source base station;
      transmitting, via the second radio, a second PDU to the target base station,
      wherein the first PDU and the second PDU have a same sequence number (SN); and
   for downlink transmissions, subsequent to transmitting the connection reconfiguration complete message,
      receiving, via the first radio, one or more PDUs from the source base station, each received PDU having at least one corresponding SN;
      receiving, via the second radio, one or more PDUs from the target base station, each received PDU having at least one corresponding SN;
      deciphering the received one or more PDUs from the source base station and the target base station respectively and storing the received one or more PDUs in a buffer;
      discarding duplicative PDUs in the buffer based on the at least one corresponding SN for each received PDU; and
      re-ordering remaining PDUs based on the at least one corresponding SN.

2. The method of claim 1, wherein the at least one corresponding SN for each PDU is a packet data convergence protocol (PDCP) SN.

3. The method of claim 1, further comprising delivering a payload of the re-ordered remaining PDUs to upper layer.

4. The method of claim 1, wherein the first PDU includes a source base station identifier and the second PDU includes a target base station identifier.

5. The method of claim 1, wherein each of the first PDU and the second PDU includes a target base station identifier and a source base station identifier.

6. A method of handover in wireless communication for a target base station comprising:
   receiving, from a source base station, a sequence number (SN) transfer message including a delta between a SN in a first protocol and a SN in a second protocol;
   transmitting, to an access and mobility function/session management function (AMF/SMF) entity, a path switch preparation request for a make before break handover for a user equipment (UE) from the source base station to the target base station, the path switch preparation request including target base station tunnel information and configured to trigger a user plane function (UPF) to transmit packet data units (PDUs) for the UE to both the target base station and the source base station during the handover;
   receiving, from the AMF/SMF entity, a path switch preparation response including UPF tunnel information; and
   establishing a tunnel between the target base station and the UPF using the UPF tunnel information.

7. The method of claim 6, further comprising:
   receiving, from the UPF, one or more packet data units (PDUs) via the tunnel, each PDU having at least one corresponding sequence number (SN) in the second protocol;
   receiving, from the source base station, one or more PDUs, each PDU having at least one corresponding SN in the second protocol;
   deciphering the received one or more PDUs from the UPF and the source base station respectively and storing the received one or more PDUs in a buffer;
   discarding duplicative PDUs in the buffer based on the at least one corresponding SN in the second protocol;
   converting, for each of the remaining PDUs, the at least one corresponding SN in the second protocol to a SN in the first protocol;
   re-ordering the converted PDUs based on the at least one corresponding SN in the first protocol; and
   transmitting, to the UE, the re-ordered PDUs.

8. The method of claim 7, wherein the at least one corresponding SN is at least one of a packet data convergence protocol (PDCP) SN, a GTP-U PDU SN, or a flow specific SN, and wherein the corresponding SN is generated by the source base station and the UPF based on the PDCP SN.

9. The method of claim 6, further comprising:
   receiving, from the source base station, one or more PDUs, each PDU having at least one corresponding SN in the first protocol;
   receiving, from the UE, one or more PDUS, each PDU having at least one corresponding SN in the first protocol;
   deciphering the received one or more PDUs from the source base station and the UE respectively and storing the received one or more PDUs in a buffer;
   discarding duplicative PDUs in the buffer based on the at least one corresponding SN in the first protocol;
   converting, for each of the remaining PDUs having at least one corresponding SN in the first protocol to a SN in the second protocol;
   re-ordering the converted PDUs based on the at least one corresponding SN in the second protocol; and
   transmitting, to the UPF, the re-ordered PDUs.

10. The method of claim 6, wherein the corresponding SN is a packet data convergence protocol (PDCP) SN.

* * * * *